(12) United States Patent
Welsch et al.

(10) Patent No.: US 7,486,498 B2
(45) Date of Patent: Feb. 3, 2009

(54) STRONG SUBSTRATE ALLOY AND COMPRESSIVELY STRESSED DIELECTRIC FILM FOR CAPACITOR WITH HIGH ENERGY DENSITY

(75) Inventors: Gerhard E. Welsch, Cleveland Heights, OH (US); Donald L. McGervey, Cleveland Heights, OH (US)

(73) Assignee: Case Western Reserve University, Cleveland, OH (US)

(*) Notice: Subject to any disclaimer, the term of this patent is extended or adjusted under 35 U.S.C. 154(b) by 447 days.

(21) Appl. No.: 11/036,507

(22) Filed: Jan. 12, 2005

(65) Prior Publication Data
US 2005/0168919 A1 Aug. 4, 2005

Related U.S. Application Data

(60) Provisional application No. 60/535,843, filed on Jan. 12, 2004.

(51) Int. Cl.
*H01G 9/00* (2006.01)

(52) U.S. Cl. ............... 361/523; 361/525; 361/528; 361/529; 361/534; 361/508

(58) Field of Classification Search ......... 361/523–525, 361/528–534, 508–512, 502–504; 29/25.03, 29/25.01, 25.93
See application file for complete search history.

(56) References Cited

U.S. PATENT DOCUMENTS

| 5,960,252 | A  | * | 9/1999  | Matsuki et al. | ........ 438/3 |
| 6,033,953 | A  | * | 3/2000  | Aoki et al.    | ...... 438/255 |
| 6,373,088 | B2 | * | 4/2002  | Kwok et al.    | ...... 257/303 |
| 6,507,062 | B1 | * | 1/2003  | Joo            | ...... 257/296 |
| 6,818,469 | B2 | * | 11/2004 | Wack et al.    | ....... 438/52 |

* cited by examiner

*Primary Examiner*—Nguyen T. Ha
(74) *Attorney, Agent, or Firm*—Tarolli, Sundheim, Covell & Tummino LLP

(57) ABSTRACT

A capacitor anode (1) includes a substrate (10) which is formed from an alloy, metal, or metal compound which has a high tensile yield strength and high elastic modulus. The material has a composition which can be anodized, yielding an adherent and compressively stressed dielectric film (12) of pure, mixed, alloyed, or doped oxide that has a high usable dielectric strength (e.g., over 50 V/μm) and high dielectric constant (e.g., 20 to over 10,000). A capacitor formed from the anode has a high energy density.

24 Claims, 12 Drawing Sheets

STRONG SUBSTRATE ALLOY AND COMPRESSIVELY STRESSED DIELECTRIC FILM FOR CAPACITOR WITH HIGH ENERGY DENSITY

This application claims the priority of U.S. Provisional Application Ser. No. 60/535,843, filed Jan. 12, 2004, the disclosure of which is incorporated herein in its entirety, by reference.

BACKGROUND OF THE INVENTION

1. Field of the Invention

The invention relates to energy storage devices. In particular, it relates to a substrate alloy and dielectric film for a capacitor, and will be described with particular reference thereto.

2. Discussion of the Art

Electrical devices, such as power supplies, switching regulators, motor control-regulators, computer electronics, audio amplifiers, surge protectors, and resistance spot welders often require substantial bursts of energy in their operation. Capacitors are energy storage devices that are commonly used to supply these energy bursts by storing energy in a circuit and delivering the energy upon timed demand. Typically, capacitors consist of two electrically conducting plates, referred to as the anode and the cathode, which are separated by a dielectric film. In order to obtain a high capacitance, a dielectric film with a large area is used. The electrical charge is stored at opposite surfaces of the dielectric film. To be effective as an energy storage device, a capacitor should have a high energy density (joules per unit mass or volume) and to be effective as a power delivering device a capacitor should have a high power density (watts per unit mass or volume).

With increased demands for small capacitors, it is desirable for capacitors to have a high energy density and high power.

U.S. Pat. No. 5,245,514 to Fife, et al., which is incorporated herein in its entirety, by reference, discloses extruded capacitor electrodes. A multifilamentary capacitor anode is formed from rods or sheets.

The present invention provides a new and improved capacitor substrate material, capacitor, and method of formation which overcome the above-referenced problems and others.

SUMMARY OF THE INVENTION

In accordance with one aspect, a capacitor anode includes an electrically conductive substrate. A dielectric film adheres to the substrate under a biaxial compression. The substrate has a tensile yield strength of at least $10^{-3}$ times the Young's modulus of the substrate. The anode may form part of a capacitor having a cathode spaced from the anode by an electrolyte.

In accordance with another aspect, a capacitor anode includes an electrically conductive substrate and a dielectric film adhering to the substrate under a biaxial compression. Edges of the substrate have a minimum radius of curvature which is at least one fourth of a thickness of the adjacent dielectric film.

In accordance with another aspect, a method of forming a capacitor anode includes forming an adherent dielectric film on a surface of an electrically conductive substrate. The dielectric film is under a biaxial compression. The substrate has a tensile yield strength of at least $10^{-3}$ times the Young's modulus of the substrate. The anode may form part of a capacitor having a cathode spaced from the anode by an electrolyte.

In accordance with another aspect, a method of forming an anode geometry that maximizes surface area per volume for a given minimum radius of curvature of the surface is provided. The minimum radius of curvature can be determined from equations (25) and (36).

An advantage of at least one embodiment of the present invention is the provision of a capacitor anode with a high energy density and a high operating electric field.

Another advantage of at least one embodiment of the present invention is the provision of a method of maintaining a dense, highly resistive dielectric through application of compressive stress.

Another advantage of at least one embodiment of the present invention is the provision of a capacitor with a high power as a result of a high surface accessibility and from a high operating voltage. The absolute operating voltage can be 1 V, or higher. The absolute operating field can be 0.5 MV/cm, or higher. The relative operating voltage can be up to 100% of the anodization voltage. The relative operating field can be a small fraction up to 100% of the dielectric strength.

Another advantage of at least one embodiment of the present invention is that the provision of a capacitor which is strong and can withstand high stress.

Another advantage of at least one embodiment of the present invention is the provision of a capacitor with a smooth surface in which edges and/or corners are provided with a minimum radius of curvature that reduces concentration of electric field at those edges and/or corners, such that a higher electric field can be sustained overall.

Another advantage of at least one embodiment of the present invention is the provision of a capacitor with a high packing efficiency due to a high volume fraction of dielectric (ratio of dielectric:anode substrate). The volume fraction can be 10% or higher, and can be as high as 90%, or higher.

Still further advantages of the present invention will be readily apparent to those skilled in the art, upon a reading of the following disclosure and a review of the accompanying drawings.

DETAILED DESCRIPTION OF THE PREFERRED EMBODIMENT

Figure 1:
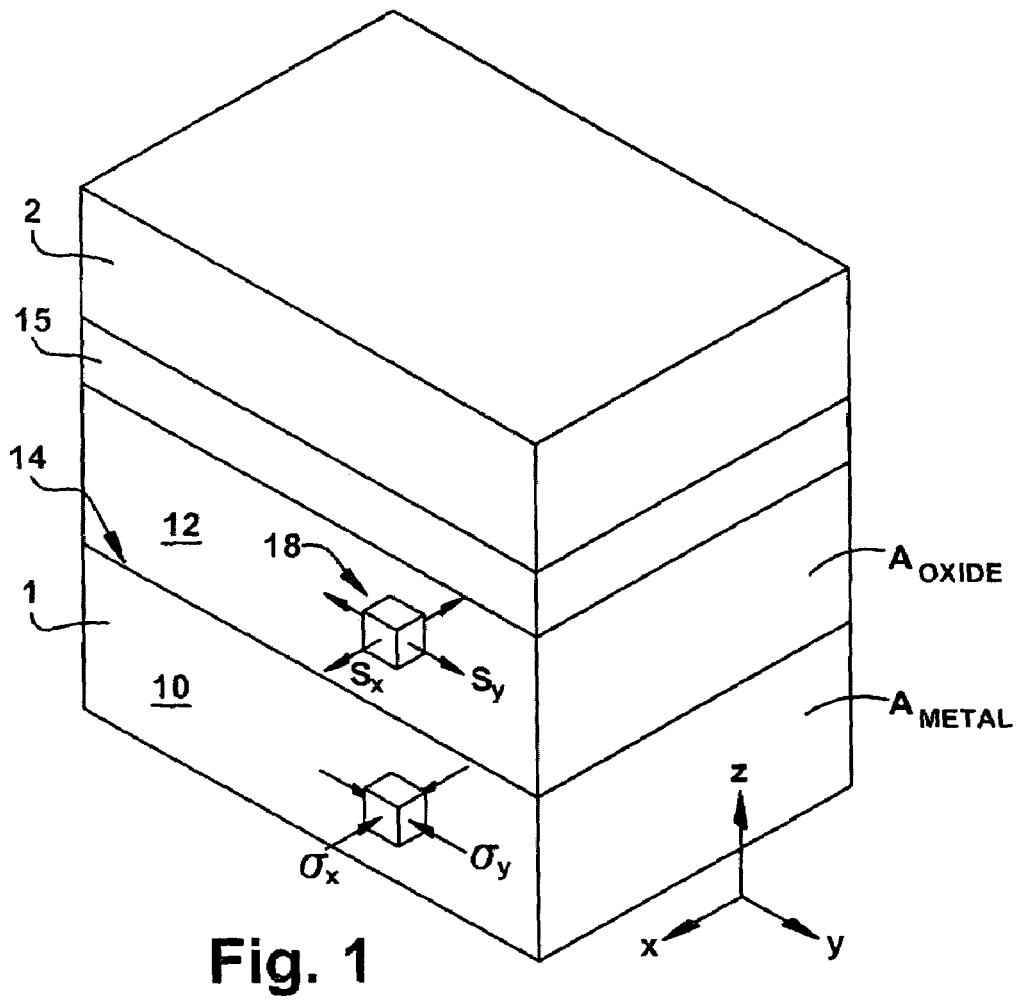
FIG. 1 is a schematic drawing showing compressive stress in dielectric and tensile stress in metal substrate and oxide film of an exemplary capacitor.

The present disclosure relates to the design and formation of an anode, which includes an electrically conductive substrate and a dielectric film adhering thereto under a compressive stress, and a capacitor formed therefrom. The substrate may be a metal, a metallic alloy, or a metal compound. Particular reference is made to alloys as substrates, although it will be appreciated that conductive metal compounds and high strength metals may alternatively be used except as otherwise noted. An alloy is a combination of two or more elements. It can be a solid solution, a supersaturated solid solution, a metastable mixture of elements, a metallic glass, or combination thereof.

The alloy serves as a substrate on which an adherent and dense dielectric film is formed. The dielectric is under a high compressive stress and has a high dielectric strength, high energy density when electrically charged, high charge density, and high electrical resistivity. Dielectric strength is the electric field strength of a dielectric and is the highest electric field [V/cm] that a dielectric can withstand before breakdown and can be, for example at least about 50 V/μm. Charge density is the charge per unit area [$Q/m^2$]. Electrical resistivity is measured in Ohm·m. Energy density is expressed as energy per unit volume or unit mass, $J/m^3$ or J/Kg. The dielectric film can have a high dielectric constant (e.g., at least 20, in one embodiment, at least 1000, and can be over 10,000).

The high compressive stress of the dielectric film may be derived from the manufacturing process and from the applied electrical field. The compressive stress can enhance or maintain a high charge density throughout the volume of the dielectric film. The substrate alloy serves as a support for the dielectric and as such has properties which enable the dielectric film to be maintained under compressive stress. A capacitor made from such an alloy and from such a dielectric can have a high energy density. The electric field strength of the capacitor can be 1 MV/cm, or higher. The present disclosure describes suitable alloy materials and strengthening methods for a capacitor substrate for achieving high compressive stress in a dielectric film and suitable substrate configurations which facilitate maintenance of high electric filed strengths.

A dielectric film with significant compressive stress (biaxial and/or hydrostatic) benefits the dielectric's usable electric field strength, charge density, dielectric constant, and insulating power. While particular reference is made to dielectrics formed by anodization (oxidation) of the underlying substrate, the benefits are realized for dielectrics in applications such as capacitors, including electrolytic capacitors, ceramic capacitors, polymer capacitors, oil capacitors, water and ice capacitors, liquid dielectric capacitors, and insulators. In one embodiment, biaxial compressive stress in the dielectric in the ranges from 0.1 MPa to 10 GPa. In one embodiment, the biaxial compressive stress is at least 1 MPa. In one embodiment, triaxial compressive stress in the dielectric ranges from 0.1 MPa to 10 GPa.

The dielectric film can be dense, and fracture-resistant to remain stable and unaffected by charging and discharging cycles. The oxide film's fracture strength to flow stress ratio ($S_{Fracture}/S_{Flow}$) can be greater than 1, and in one embodiment, significantly greater than 1. Fracture strength, under tension, is the same as tensile strength. Under compression, fracture strength is the stress at which a crack forms. In shear, the fracture strength is the shear stress at which a crack forms. An oxide's flow stress ($S_{Flow}$) is the stress at which plastic deformation of the oxide occurs.

Methods to apply and maintain compressive stress on dielectric oxide film during synthesis, storage, and operation of a device of which the dielectric is a part are disclosed herein. Methods to impart and maintain compressive stress on a dielectric film during film growth and during further processing, storage and operation of a dielectric film are disclosed. Methods include:

(a) Anodic growth of dense oxide film on a mechanically strong metal substrate, the generation of compressive stress in the oxide during film growth, and support of the film's compressive stress by a tensile stressed strong metal substrate.

(b) Deposition of a dense layer of dielectric onto a metal substrate with strong adherence and generation of compressive stress in the dielectric by differential thermal contraction.

(c) Application of hydrostatic pressure on a liquid dielectric, for example, with help of a mechanically strong enclosure.

(d) Application of a hydrostatic pressure on a liquid electrolyte of an electrolytic capacitor in a strong enclosure. The pressurized electrolyte applies its hydrostatic pressure also on the solid dielectric of the capacitor.

The capacitor substrate may be an alloy, electrically conductive compound or strengthened metal and may have a high tensile yield strength and creep strength. The capacitor substrate may have a tensile yield strength or creep strength in the range of 10 MPa to 6 GPa.

In one embodiment, the capacitor substrate alloy has a high elastic stiffness. Elastic stiffness is the property that is quantitatively described by the elastic modulus. In one embodiment, the capacitor substrate alloy has a high Young's modulus, in the range of 10 to 600 GPa.

In one embodiment, the substrate has a tensile yield strength of at least $10^{-3}$ times the Young's modulus of the substrate In one embodiment, the oxide dielectric strongly adheres to the metal substrate.

In one embodiment, metallurgical methods to increase the tensile yield strength of a capacitor substrate metal enable it to support compressive stress in an adherent (oxide) dielectric with minimum elastic and plastic distortion, and thereby enhances the capacitor's energy density. The methods include:
(a) Formation of a solid solution alloy in which the solute atoms increase the alloy's shear flow stress and tensile yield strength.
(b) Formation of an alloy with fine precipitates in the 1 to 100 nm range, in which the precipitates increase the alloy's shear flow stress and tensile yield strength.
(c) Formation of alloy in the form of a metallic glass with high tensile yield strength.
(d) Formation of a capacitor substrate alloy from the elements, Be, Ti, Zr, Hf, V, Ta, Nb, Al, Si, Ge, and alloying them with one or more elements from the group B, C, N, O, Be, Mg, Ca, Sr, Ba, Y, lanthanide elements, Ti, Zr, Hf, V, Nb, Ta, Cr, Mo, W, Mn, Re, Al, Si, Ge, Sn, Pb, Ga, In to increase the alloy's tensile yield strength.
(e) Formation of a capacitor substrate alloy from the elements, Be, Ti, Zr, Hf, V, Ta, Nb, Al, Si, Ge, and alloying them with one or more elements from the group B, C, N, O, Be, Y, lanthanide elements, Ti, Zr, Hf, V, Nb, Ta, Cr, Mo, W, Mn, Tc, Re, Fe, Ru, Os, Co, Rh, Ir, Ni, Pd, Pt, Si, Ge, Sn, to increase the alloy's elastic stiffness.
(f) Cold-working the anode metal to form a strain-hardened condition that increases the metal/alloy's tensile yield strength.
(g) Age-hardening of the anode metal/alloy to increase its tensile yield strength.
(h) Refinement of a substrate metal's grain or fiber size to sub-micrometer grain- or fiber-widths to increase the tensile yield strength by a Hall-Petch mechanism. In drawn wire a very fine-fibrous grain structure provides high tensile yield strength in the range from 100 MPa to over 6 GPa.

In one embodiment, the elastic stiffness of a capacitor substrate metal is increased to enable the support of compressively stressed, adherent dielectric film with minimum elastic distortion, thereby enhancing the capacitor's energy density. Methods to increase the modulus include forming an alloy between one or more valve metals with elements that increase the bond strength between atoms. Alloy elements are chosen from the elements B, C, N, O, Be, Mg, Ca, Sr, Ba, Y, lanthanide elements, Ti, Zr, Hf, V, Nb, Ta, Cr, Mo, W, Mn, Re, Al, Si, Ge, Tc, Re, Fe, Ru, Os, Co, Rh, Ir, Ni, Pd, Pt, and combinations thereof.

In one embodiment, mechanical forming of capacitor substrate metal by pressing, extrusion, rolling, drawing, stretching, bending, coiling, etc., is used to generate shapes with uniform and accurately controlled cross-section, radius of curvature, and geometry that enables a high ratio of dielectric/metal to form a capacitor anode with high energy density.

In one embodiment, a uniform minimum radius of curvature on the capacitor is used to maximize the capacitor anode's energy density. The minimum radius of curvature is chosen depending on the capacitor's voltage.

In one embodiment, a metal anode includes a substrate with high tensile strength which enables the support of compressive stress in an adherent oxide film with small ratio of metal/oxide. Tensile strength is the rupture strength, in tension.

In one embodiment, a packaged electrolytic capacitor is formed with energy efficiency as high as ⅓ of the dielectric's energy density.

In one embodiment, a composition and purity of the capacitor substrate alloy are more precisely controlled by forming the metal for a capacitor substrate in bulk alloy and by using thermal and mechanical processing to form it into the desired anode shape, as opposed to synthesis of a substrate alloy by chemical reaction or by vapor deposition.

In one embodiment, a method of forming an anodic film with high dielectric constant, dielectric strength, and energy density is provided by incorporating alloy or dopant elements from an alloy substrate into the anodic film in the form of oxide-alloy or oxide-dopant molecules.

In one embodiment, a capacitor anode is formed with a uniform minimum radius of curvature so that it can operate at higher voltage than an anode made from sponge metal or sintered powder. The minimum radius of curvature avoids the occurrence of local concentrations in electric field.

In one embodiment, a mechanically formed capacitor anode is provided with uniform cross sections of metal and pores which are easily infiltrated with electrolyte.

In one embodiment, mechanical forming of a capacitor anode with a uniform cross-section and a minimum radius of curvature that is equal to or not much less than half the diameter or half the thickness of the narrow parts of a capacitor anode. Additional polishing, by mechanical, or chemical, or electrochemical methods, can flatten or remove surface bumps, crevices, or grooves of small radius of curvature. Eliminating regions with small radius of curvature avoids the occurrence of locally increased electric field in the oxide film. It enables a higher use voltage for the capacitor. The benefits are for a capacitor's energy density and power.

In one embodiment, cylinder-, sheet-, sphere-, or hemisphere-geometries as well as wire shapes with rounded, oval or elliptical cross sections can be used to form capacitor anodes with a controllable minimum radius of curvature. The minimum radius of curvature, being proportional to the intended anodizing voltage and proportional to the intended operating voltage, determines the minimum diameter or thickness of a capacitor anode. Optimally, capacitor anodes are formed of wires with a uniform diameter and equal to two times the minimum radius of curvature.

In one embodiment, the anode is formed without sharp corners or sharp edges. Where the anode includes intersecting planes, the edges and corners where the planes intersect are rounded. For example, a wire-shaped anode is formed with a rounded end, rather than a flat end, or a plate-shaped anode is formed with rounded edges and corners. The convex edges of the substrate can have a minimum radius of curvature which is at least one fourth of a thickness of the adjacent dielectric film. Any concave portions of the substrate surface (e.g., indents) may have a radius of curvature which is greater than the dielectric film thickness.

In one embodiment, capacitor anodes are formed of thin sheets with edges thickened so they have at least the minimum radius of curvature required for a particular operating voltage in accordance with equations (25) and (36). The minimum radius of curvature of a capacitor anode is proportional to the intended voltage and inversely proportional to the dielectric strength in accordance with equation (25). With increasing mechanical strength of the anode metal, the minimum radius of curvature of a capacitor anode can be decreased as predicted by equations (25) and (36).

Ti, Zr, Hf, V, Nb, Ta are valve metals that can be used to form the matrix phase of a capacitor anode alloy. Group IIa, and IVa elements of the periodic table can be added to the anode alloy to increase the dielectric constant of oxide formed by anodizing the alloy.

Drawing of wire through round dies or bundle-drawing of separate wires while embedded in a deformable matrix that is later selectively dissolved, are economical methods for production of thin fibers suitable as anode substrates. Suitable materials for forming the matrix include calcium, magnesium and combinations thereof.

Arrangement of round or oval wire-anodes in a bundle of parallel wires achieves high packing density and high energy density.

Arrangement of round or oval wire-anodes in a flat bundle of parallel wires achieves high packing density, high energy density, and high power.

The radius of curvature of wire ends may be increased to reduce stress and electric field concentration.

Wire ends may be insulated to minimize their vulnerability to stress and electric field concentration. The insulation can be achieved by coating the wire end with an insulator.

Anode metal/alloy with non-isotropic yield- or fracture-strength can be used to form a capacitor anode with high energy density by charging only areas with strong, fracture-resistant metal backing, while areas with weak metal backing are insulated.

Thin wires can be woven or braided into a wire mesh-shaped or rope-shaped anode structure to enable easier handling and processing into a capacitor.

The benefit of compressive stress on the performance of oxide dielectric is also possible for dielectrics made by methods other than anodizing, such as oxide made by thermal oxidation, coating, deposition, or chemical conversion of precursors.

The benefit of compressive stress can also be realized by applying hydrostatic pressure to a liquid electrolyte. The pressurized electrolyte applies pressure on the dielectric.

The benefits of compressive stress on dielectric properties is also possible for non-oxide dielectrics, such as for polymers, non-oxide ceramics, nitrides, carbides, borides, salts, water, ice, oil, wax, and any dielectric whether it is solid or liquid.

The benefits of smooth, rounded edges, ends, and corners with a minimum radius of curvature apply to all dielectrics with or without compressive stress by minimizing local field concentrations.

By way of example, FIG. 1 shows a portion of an exemplary capacitor which includes an anode 1 and a cathode 2. The anode includes a substrate 10 formed of a metallic material, such as an alloy, compound, or metal, and a film 12 of a dielectric material adhering to a surface 14 of substrate. The substrate can be, for example, at least 95% metal, in one embodiment at least 98% metal. The dielectric film 12 may be an oxide of the metal which forms the substrate 10. An electrolyte 15 optionally spaces the dielectric material from the cathode. The electrolyte may be liquid or solid, e.g. an acid such as $H_3PO_4$ or other suitable current carrying material as disclosed, for example, in U.S. application Ser. No. 09/914, 517, filed on Apr. 29, 2002, and U.S. application Ser. No. 10/182,927, filed on Aug. 2, 2002, the disclosures of which are incorporated herein by reference in their entireties.

Stress is a force acting on a cross sectional area of a unit element of a body and can be defined as F/A, where F is the force and A is the cross sectional area. FIG. 1 illustrates an area of the dielectric as $A_{oxide}$ and an area of the underlying substrate as $A_{metal}$. Stresses in the metal substrate are denoted by $\sigma$. Stresses in an adherent oxide film are denoted by S. Tensile stress tends to increase the volume of a body and decrease its density while compressive stress tends to decrease the volume of a body and increase its density. Compressive stress is generally assigned a negative value and tensile stress is assigned a positive value. The stress state is described using a Cartesian coordinate system, having three orthogonal directions (x, y z). Compressive plane-stress is a compressive stress in which compression forces act in two directions on the cross sectional areas of a volume element (a biaxial stress, e.g., x, y). The directions define the plane. The compression forces in each direction can be the same or different. Triaxial stress is a stress on an element in three directions, i.e., a plane stress and a stress perpendicular to the plane (x, y, z). The compression forces in each direction can be the same or different.

The dielectric's electric field strength and its insulating strength can be improved by application of a compressive stress. The insulating strength of a dielectric is the same as its electric field strength where a dielectric is used as an insulator. The compressive stress can be applied to the dielectric film during its synthesis, fabrication, storage, and/or operation. The benefits of compressive stress are realized in capacitor dielectrics made by anodizing as well as in dense and pore-free dielectrics made by other processing methods. Compressive stress also benefits dielectrics that are used for insulation in electrical devices. Compressive stress may also benefit the dielectric strength and the insulating power of non-oxide ceramics and polymers. Examples of dielectric materials that can benefit from compressive stress include water, ice, oils, non-conductive ceramics, rubbers, plastics, polymers, waxes, and glass. In some cases it has been found that pressure can also increase the dielectric constant.

In the case of a dielectric film 12, which is grown on a substrate 10 by oxidation of the substrate, a rigid metal substrate 10 exercises a constraint on a growing, adherent dielectric film 12 that can lead to compressive growth stress in the plane (x-y plane in FIG. 1), especially when the film has been made by anodizing. Compressive growth stress is a stress which develops during the growth of an oxide film on a substrate. The compressive growth stress is primarily due to a difference in volume of the oxide as compared to that of the substrate material from which it is derived.

In a direction normal to the film plane (z-direction) the stress may be as low as zero when the growing film can expand freely in the thickness direction. However, in the plane of the film a compressive stress will be generated when oxide molecules are inserted into the interior of the film. The stress state can be described on a volume element 18 having x-and y-axes in the plane of the film and the z-axis normal to the film, see FIG. 1. With isotropic material, the compressive stresses $S_x$ and $S_y$ in the x, y axes of the film plane, respectively, are of equal magnitude. For purposes of discussion, it is assumed that $S_x$ and $S_y$ are equal, and we refer to them as the plane-stress ($S_{plane}$) of the dielectric. The magnitude of the plane-stress depends on several factors, such as the growth mechanism, the oxide's yield strength or creep strength, and the strength of the metal substrate. Creep strength is the stress level at which a material deforms at a specified (maximum) strain rate.

A compressive plane stress is beneficial for the performance of a dielectric 12, because it prevents cracking and because it compresses dilated volume at defects in the dielectric. Compressive stress makes the oxide denser and more resistive to leakage current and it therefore reduces the risk of breakdown. It also improves the effectiveness of a self-repair reaction. A capacitor with a compressed dielectric layer 12 may be operated at a relatively high fraction of the theoretical dielectric strength. Hence, such a capacitor has a high energy density. The oxide film 12 is a dielectric that enables the storage of opposite electrical charges on opposite sides of the film. Energy is stored in the electric field between these opposite charges.

The oxide film of an electrolytic capacitor is preferred to be of uniform thickness, have a homogeneous glassy or amorphous structure, and have high density. Polycrystalline films are less preferred because grain boundaries can be areas of locally reduced density and can be fast diffusion and/or fast electrical conduction paths. In such cases, they tend to lower the dielectric strength of the oxide. Such a capacitor is then generally operated at a significantly de-rated use-voltage or use-electric field. Other defects that reduce the electric field strength of an oxide film are vacancies, voids, and structural that cause density fluctuations.

Compression stress in an oxide film is beneficial because it opposes formation of vacancies and/or voids and it enhances the oxide density and the dielectric strength. High density enhances the oxide's resistance against leakage current, which is beneficial for the stability and the operating performance of the capacitor. High density also reduces the probability of electric breakdown. The oxide films of electrolytic capacitors can be grown by anodizing. Beneficial compression stress of 10 Pa to over $10^{10}$ Pa may be generated in the anodic films during growth and during operation of the capacitor. When an oxidizing electrolyte is used, defects in the dielectric can be repaired by injection or deposition of new oxide molecules into or nearby the defect, so that the defect is either re-compressed or the oxide film is grown thicker in this region.

If the anode substrate deforms or yields under the imposed tensile stress it relaxes the compressive stress in the oxide, and as a result it relaxes the oxide density. New defects can spring up and increase the leakage current or cause breakdown unless self-repair can heal the defects.

The compression in an oxide film is preferably balanced by a tensile force in the anode; hence the anode substrate metal/alloy is stressed in tension. The substrate is preferably one which is able to bear the tensile stress with as little deformation as possible. Ideally, the substrate is strong so that it remains rigid and suffers only small elastic strain. It is further preferred that the anode has a high elastic stiffness (Young's modulus in the range of 50 to 500 GPa) so that the operating stresses cause small elastic strains. Preferably, the substrate is one that does not yield plastically, does not creep, and does not fatigue. The oxide film is thereby compressed in the thickness direction, and if it is unsupported by a substrate it tends to undergo a Poisson expansion in the plane of the film. However, when attached to a substrate (the anode) it is hindered in its expansion in the plane, and a biaxial compressive stress is also generated in the plane. To maintain an equilibrium of forces the substrate must, therefore, bear a tensile stress. It is preferred that the substrate is strong in tension to enable it to remain relatively rigid and support the compression stress in the oxide film.

Desired mechanical properties of the anode substrate include a high yield strength and a high elastic modulus. The stronger and stiffer the substrate is, the more readily can the ratio of anode/oxide cross-section be optimized. For example, with a strong anode one can afford a low anode/oxide cross-section ratio, which enables a high volume fraction of dielectric and a high energy density.

Compression of the oxide film thus has benefits of formation and maintenance of a dense oxide (dielectric) film during anodic growth and during capacitor operation. A dense oxide film has higher resistance to leakage current than a non-dense oxide. Low leakage current is beneficial for the capacitor's performance. A strong anode substrate can support a relatively high volume fraction of compressed oxide dielectric and so increases the capacitor's energy density.

In one embodiment, the electrolytic capacitor includes a layer composed of metal substrate 10 bonded to an oxide dielectric surface film 12. The forces $F_{oxide}$ and $F_{metal}$ are the products of stress and cross section area for the oxide film 12 and the metal substrate 10, respectively. Compressive stress S in the oxide film is preferably force-balanced with a tensile stress a in the substrate, as provided in Eqn. 1. In any particular direction in the x-y plane the force balance is thus:

$$F_{oxide} + F_{metal} = 0 \quad \text{(Eqn. 1)}$$

In terms of stresses it can be expressed as:

$$\underbrace{S_y A_{y(oxide)}}_{\text{oxide compression}} + \underbrace{\sigma_y A_{y(metal)}}_{\text{metal tension}} = 0 \quad y \text{ direction} \quad \text{(Eqn. 2)}$$

$$S_x \cdot A_{x(oxide)} + \sigma_x \cdot A_{x(metal)} = 0 \quad x \text{ direction}$$

where $S_x$ and $S_y$ are the oxide compressive stress in directions x and y, and $A_{x\ (oxide)}$ is the cross section area of the oxide normal to x. Similarly, $\sigma_x$ and $\sigma_y$ are the tensile stress in the metal substrate in directions x and y, respectively, and $A_{x\ (metal)}$ and $A_{y\ (metal)}$ are the cross section area of the metal normal to x and y respectively.

When oxide film grows by inserting new oxide molecules into the interior of the film 12 it develops compressive stress up to a maximum value that is determined by a yield criterion. For a balanced biaxial compression ($S_x = S_y = S_{plane}$) and a compressive stress $S_z$ normal to the film, a yield criterion predicts the onset of plastic flow when the difference between the normal stress, $S_x$, and the in-plane stress $S_{plane}$ is equal to the oxide's flow stress $S_{Flow}$ ($S_z - S_{plane} = S_{Flow}$).

The value of $S_z$ is determined by the coulombic attraction of opposite charges on either side of the dielectric, while the value of $S_{Flow}$ is a material property of the oxide material. Its value is determined primarily by the oxide's composition, structure and structural defects and to some extent by temperature and strain rate. In the discharged condition, there is no Coulombic attraction and the normal stress $S_z$ on the dielectric is zero. In the discharged condition the maximum compressive plane stress is equal to the oxide's flow stress, but it can climb higher when the dielectric is charged. It is beneficial for the structural integrity of the dielectric that its fracture strength, $S_{Fracture}$, is greater than the flow stress. It is desirable that the dielectric oxide has a high ratio of ($S_{Fracture}/S_{Flow}$).

The metal substrate is selected to have a sufficient tensile strength and a sufficient thickness to be able to balance the forces generated in the dielectric and thereby support the compression in the oxide. The tensile strength depends for achieving this depends on the magnitude of the oxide's compressive stress and the oxide film thickness. The metal, in one embodiment, does not yield or creep under the tensile force:

$$F_{metal} = \sigma \cdot A_{metal} = -S \cdot A_{oxide}. \quad \text{(Eqn. 3)}$$

If the metal has a high tensile yield strength, the force balance can be achieved with a thin metal substrate. Tensile yield strength is the stress level at which there is a transition from elastic to plastic deformation. On the other hand, if the tensile yield strength of the metal is low, the metal substrate may have a larger thickness, so its stress level remains low enough to avoid yielding. Yielding or creep leads to a relaxation of the compressive stress in the oxide and increases the risk of defects in the oxide. The oxide's dielectric strength and resistivity may then suffer. From these considerations, it is apparent that a strong substrate metal is desirable to support a certain oxide compressive stress with a relatively small ratio of metal to oxide cross-sectional area. Since the electric energy of a capacitor is stored in the electrostatic field in the dielectric, it is generally desirable to maximize energy density by using the minimum amount of substrate metal that is capable of supporting the stressed oxide film. A substrate metal with high yield- and creep strength is desired for a small ratio of metal to oxide.

The performance criteria for an insulating dielectric include the following: dielectric field strength ($\xi_d$), resistivity against leakage current ($\rho$), electrical breakdown strength, mechanical yield and fracture strength, durability in operation, and relative permittivity or relative magnitude of the dielectric constant for a dielectric substance ($\epsilon$), which will be referred to as the dielectric constant. The absolute dielectric constant ($\epsilon\,\epsilon_o$) is the product of charge (Q) per unit area (A) and usable electric field strength ($\xi$) [V/m], i.e., $$\epsilon\,\epsilon_o = Q/A\cdot\xi \qquad \text{(Eqn. 4)}$$

where $\epsilon_o$ is the dielectric constant of vacuum, i.e., the permittivity of free space ($=\frac{1}{36\pi}$n F/m=$8.854\times10^{-12}$ F/m), For a flat film dielectric, the energy density $U_d$ (Joules per unit volume of dielectric) is given by:

$$U_d = \tfrac{1}{2}\epsilon\,\epsilon_o\,\xi^2 \qquad \text{(Eqn. 5)}$$

Many dielectric applications benefit from a low leakage current and a low risk of electrical breakdown. This can be achieved by limiting the operating electric field to a fraction a of $\xi_d$. The value of the fraction a is between 0 and 1. It depends on the quality of the dielectric, so that the usable electric field strength $\xi_{use}$ is a fraction of the dielectric strength, $\xi_d$:

$$\xi_{use} = \alpha\xi_d \qquad \text{(Eqn. 6)}$$

The value of a affects the practically achievable energy density, which is proportional to $\alpha^2$:

$$U_d = \tfrac{1}{2}\epsilon\,\epsilon_o\,(\alpha\,\xi_d)^2 \qquad \text{(Eqn. 7)}$$

The number density and the severity of defects in the dielectric are detrimental to the value of $\alpha$. In a capacitor which has one or more severe defects or a large concentration of less severe defects in its dielectric film, the value of $\alpha$ may be as low as 0.01, with the result that the energy density of such a capacitor is only a small fraction of the theoretically possible energy density. When the defects in the dielectric are mild and if spontaneous repair of such defects is provided, the value of $\alpha$ is increased to be closer to 1. 'Electrolytic' capacitors are of this type. While the chemical composition of the dielectric of an electrolytic capacitor may be similar or the same as that of a 'ceramic' capacitor, its energy density is usually much higher. The present capacitor may have a value of $\alpha$ of close to 1, e.g., at least 0.5 or at least 0.7.

The dielectric film can be synthesized and processed by a variety of methods. For example, dielectric films for capacitors can be formed from pure or mixed oxides of metals by anodizing a substrate alloy, which converts a surface layer of the alloy into an oxide dielectric film. Capacitor dielectrics made from identical chemical composition but different processing methods may differ widely in energy density. Some general observations in this regard are as follows:

(a) High energy density is generally obtained from thin, dense, and homogeneous dielectric films. Such films can be made by anodization.

(b) High energy density is generally obtained with a dielectric (oxide) layer of uniform thickness, high dielectric strength and high dielectric constant.

(c) Oxide dielectrics formed by anodizing tend to be dense and homogeneous, often amorphous, and have compressive stress. The defects of such oxide tend to be small and mild, and can be contained or rendered harmless with self-repair treatment. Such oxide film can be operated at relatively high electric field, thus enabling an energy density that is higher than that of a capacitor without compressive stress or without self-repair ability.

Ceramic processing methods, such as sintering of powder, vapor deposition, deposition from sol/gel, etc., can produce dielectrics with tailored compositions and high dielectric constant, but the useable field in the dielectric, $\xi_{use}$, is often a small fraction of the theoretically achievable dielectric strength, $\xi_d$. One reason for this is that crystal defects, such as phase and grain boundaries, vacancies, voids, and local fluctuations in density and homogeneity reduce the dielectric strength. Often, such dielectrics are associated with a lack of uniform compressive stress. They may even exhibit fluctuation in localized stress from tension to compression. Defects and tensile-stressed regions often result in locally reduced dielectric strength, in reduced insulating power, and in reduced energy density. In contrast, oxide films grown by anodizing tend to be uniform, dense and homogeneous and have compressive stress. Defects that remain in a compressed anodic oxide film tend to be sufficiently mild or small, and can be readily repaired during capacitor use. A spontaneous self-repair mechanism is afforded in so-called 'electrolytic capacitors' by the use of oxygen-ion-conducting electrolyte on the cathode side of the capacitor's dielectric. The electrolyte provides oxygen ions for injection and spontaneous repair and re-compression of defects in an anodic dielectric film. The self-repair ability enables operation of an electrolytic capacitor at a high $\xi_{use}/\xi_d$ ratio, and therefore at a high energy density.

A good capacitor preferably has the following characteristics: (1) Its geometry is one in which the dielectric is readily accessed electrically, that is, it has a low equivalent series resistance that allows rapid charging and discharging. (2) It has a high electrical resistance of the dielectric to prevent or minimize leakage current. A good dielectric, therefore, has a high electrical resistance which is uniform at all locations. (3) It has long-term stability and can sustain many charging-discharging cycles. Conventionally, dielectrics can suffer damage during use.

Alloys for capacitor anodes can be designed in composition, microstructure and shape to enable efficient utilization of the volume and the surface of the capacitor anode.

The capacitor can be made through a series of processing steps which include synthesis of an alloy and growth of a dielectric film thereon. The alloy can be formed from a valve metal or other suitable metal, for example, by alloying or doping the valve metal with elements that increase the elastic stiffness and the tensile yield strength of the alloy. A valve metal is generally a metal that forms an insulating oxide during anodization. Alternatively or additionally, alloying or doping of the valve metal can be performed with elements that, when incorporated into a dielectric film grown or otherwise formed on such an alloy, enhance the properties of the dielectric film. This is followed by growth of an adherent dielectric film on the alloy by anodizing, or other suitable method. Other methods of forming dielectric films, such as hot pressing of a powdered material, chemical conversion coating, and deposition from a precursor solution, are also contemplated.

For example, alloys or intimate mixtures of the respective metals can be prepared by melting of the two or more metals and rapid solidification of the molten mixture. Mixed oxide or doped dielectric films are then grown on the alloys by anodization.

Making the substrate alloy with a high tensile strength and high elastic stiffness enables it to support a high compressive plane-stress in the dielectric. A strong substrate metal permits a high dielectric/metal volume ratio, which is beneficial for the energy density of the capacitor. The tensile strength is related to the alloy composition and its fabrication process. The fabrication process may include various strengthening methods for raising the tensile stength. Strengthening methods suited to crystalline alloys include solid-solution-hardening, precipitation-hardening, hardening through phase transformation and by aging treatment, as well as through grain refinement, cold work, and particle irradiation. Another strengthening method is to make the alloy amorphous (no grains or crystals). Combinations of two or more strengthening methods can be employed.

Alloys For Capacitor Substrates

Alloying is the addition of alloying elements to a base metal. The base metal can be the predominant element in the alloy, although it need not be so. Suitable base metals for electrolytic capacitor substrates include valve metals selected from the group consisting of Al, Ti, Nb, Zr, Ta, Be, Hf, V, and combinations thereof. Other exemplary elements that form oxide dielectrics and which can be used as the base metal include Si, Ge, Ga, Sn, and combinations thereof. Suitable alloying elements include those selected from the group consisting of B, C, N, O, Ti, Zr, Hf, V, Nb, Ta, Cr, Mo, W, Be, Mn, Tc, Re, Ru, Rh, Pd, Os, Ir, Pt, Mg, Ca, Sr, Ba, Al, Si, Ge, Ga, Sn, Pb, In, the rare-earth metals Y, La, Ce, Pr, Nd, Pm, Sm, Eu, Gd, Tb, Dy, Ho, Er, Tm, Yb and Lu, and combinations thereof. These alloying elements may be taken up into solid solution or form second phases or precipitates with the base metal. Particularly suited base metals for forming the alloy include Ta, Ti, Nb, Zr, and Al. The base metal preferably comprises at least 30% of the alloy, more preferably, at least 50%.

For example, an exemplary alloy includes Ta at from about 10% to about 99% by weight of the alloy, Ti at from about 90% to about 1%, and O (oxygen) at from about 100 ppm to about 5%, and may optionally contain an earth alkali element, such as Sr or Ba at concentration of 100 ppm to 5%. Another exemplary alloy includes Ta as a base metal with W at 1-30% by weight of the alloy and one or more of carbon and nitrogen at from about 10 ppm to about 3,000 ppm.

The alloy composition is one which can be anodized to grow a dielectric film which comprises a mixed, alloyed, or doped oxide. Such oxides can have high dielectric strength and high dielectric constants, ranging from about 25 to over 10,000, in order to achieve very high energy density. The composition, processing and microstructure of the substrate alloy can be chosen to achieve one or more of: a high mechanical strength for the substrate, that is, the alloy has a high tensile yield strength; a high elastic modulus; the growth of an adherent anodic oxide film; and pure or mixed or doped anodic oxide with high dielectric strength and low leakage current. When anodized, the alloy yields oxide molecules of high dielectric constant that are either embedded in the anodic oxide film, or form one or more layers in the anodic oxide film, or form a mixed oxide or an oxide alloy.

The alloying element may be selected to increase the elastic modulus of the substrate 10. The elastic modulus (Young's modulus, E), is a ratio of stress/elastic strain and is approximately a constant for metals and oxides. The elastic modulus is increased by alloy elements that increase inter-atomic bond strength and which decrease the lattice parameter. Examples of alloys with increased Young's modulus are titanium alloys with Al, or C, or N, or O, as the alloying element, in solid solution.

Independent of the effect on Young's modulus, alloying with any element to form a solid solution alloy or an alloy with fine (nm size) and uniformly distributed precipitates increases the yield strength. The strengthening is especially strong by alloy atoms that cause elastic distortion in the lattice surrounding them. Examples of such alloys and their hardening potentials are listed below.

| Alloy | Hardening coefficient |
|---|---|
| Ta with up to 1 atom percent N | α = 677 MPa per atom percent N |
| Ta with up to 1 atom percent O | α = 392 MPa per atom percent O |
| Ti with up to 1 atom percent N | α = 481 MPa per atom percent N |
| Ti with up to 1 atom percent O | α = 304 MPa per atom percent O |

Likewise, precipitates that are coherent with the host lattice but cause elastic strain fields in the surrounding lattice are potent in increasing the alloy's yield strength. An example of such alloy is Al—Cu alloy containing finely dispersed, coherent $Al_2Cu$ precipitates. The precipitates can be grown during an aging treatment from a super-saturated solid solution, hence the term 'age-hardened'. The hardening mechanisms due to alloy elements can be classified into several categories, listed below.

The alloy used as the substrate 10 may be a substitutional alloy, interstitial alloy, precipitation-hardened alloy, metallic glass alloy, or a combination thereof.

Interstitial alloys are formed with elements that are much smaller than the host atom can form, that is their atoms occupy interstitial spaces in the crystal lattice of the host element rather than substituting a host atom on its lattice site. Hydrogen, boron, carbon, nitrogen and oxygen are interstitial alloy elements. Of these hydrogen is smallest and most mobile and has the smallest lattice distorting effect. The other interstitial elements tend to cause severe tetragonal lattice distortions resulting in high frictional stress for dislocations and high increase in yield strength. The interstitial atoms often contribute their electrons to the bond-forming electron orbitals and generally cause an increase in Young's modulus. Alloying of valve metals, such as titanium, zirconium hafnium, niobium, vanadium, and tantalum, with interstitial alloy elements, B, C, N tends to increase the elastic modulus and yield strength. The interstitial elements hydrogen and oxygen can also increase the modulus and yield strength. However, these elements may be less favored to minimize the leakage current through the dielectric film of a capacitor. This modulus effect may be offset (in part) by dilation of the host atom lattice that is usually a consequence of introducing interstitial elements.

For example, boron in solid solution in Ti is a potent hardener. The equilibrium solubility in alpha and beta Ti is <1 at %. At higher concentrations, it forms high melting Ti-boride compounds. In the form of fine TiB, $Ti_3B_4$ and $TiB_2$ precipitates they harden the alloy by effectively blocking dislocation glide. Carbon in solid solution is a potent hardener. The equilibrium solubility in alpha and beta Ti is between 0.5 and 1 atom %. At higher C-concentrations it forms high-melting TiC precipitates. Nitrogen is an alpha-Ti stabilizer and very potent solid-solution hardener. The equilibrium solid solubility is 22 at % in alpha-titanium and 6.2 at % in beta titanium. At concentrations exceeding the solubility limit $Ti_2N$ and TiN precipitates are formed. Both, solid solutions and alloys with fine nitride precipitates are very hard. Oxygen has high solid solubility in alpha-Ti. It is a potent strengthener, but its use may not be advisable for electrolytic capacitor anodes because of potential adverse effect on leakage current in oxide dielectric. Similar effects are noted with other valve metals.

Interstitial elements, where used, can be individually present in amounts of from about 20 ppm by weight or more. In one embodiment, the interstitial elements, in total, are present at 100 ppm, or more. In one embodiment, one or more interstitial elements are each present at 20-10,000 ppm. In one embodiment, the interstitial elements, in total, are present at 10,000 ppm, or less. In one embodiment, the interstitial elements, in total, are present at about 1000 ppm, or less. While larger amounts can be used in some instances, the interstitial element(s) is preferably not used in an amount which causes the resulting alloy to become brittle.

Substitutional alloys are formed with alloy elements whose atom sizes are of the same order of magnitude as that of the matrix metal. Differences in atom size and in electronic charge between the alloy elements and the base metal cause elastic strains in the alloy's crystal lattice. A consequence is increased friction against glide of dislocations. The shear flow stress and tensile yield stress of the alloy is therefore higher than that of the pure base element. The increase in yield strength depends on the concentration of the alloy element and on the degree of the lattice distortion caused by the alloy atoms. The increase of yield strength per atom percent solute concentration may range from zero to more than double the yield strength of the pure base metal. Changes in Young's modulus may range from zero to several percent per atom percent solute concentration.

Metals with high interatomic bond strength or high-melting temperature can increase the elastic modulus of valve metals alloys and are generally suited as substitutional alloying elements. There are exceptions, however, namely electronic effects may cause a decrease in modulus for certain limited alloy concentrations, e.g., in alloys with titanium alloys that result in an electron per atom ratio of near 4.1. This situation is obtained when V, Nb or Mo are added to titanium in moderate concentrations, such as 10, 15 and 7 weight percent, respectively. Despite such anomaly, the yield strength is always increased by the addition of the alloy elements by mechanisms of solid-solution-strengthening or precipitation-strengthening. Examples of substitutional elements which may be used to increase elastic modulus and yield strength-of a valve metal are given in Table 1, below.

Exemplary substitution elements include Mg, Ca, Sr, Ba, Y, lanthanide elements, Be, Ti, Zr, Nb, Hf, V, Ta, Cr, Mo, W, Re, Al, Si, Ge, Ga, Sn, Pb, and In, and as such they can be used in larger amounts than the interstitial elements. In one embodiment, the substitution elements in total account for from 0.1% to 90% by weight of the alloy. In another embodiment, each substitution element is present at from about 0.1 to 50% by weight of the alloy. In one embodiment, each substitution element is present at a concentration of at least about 1%. Group IIA elements (Be, Mg, Ca, Sr, Ba), where used, are preferably present at from about 0.01 to 30% by wt. Heavier elements like Ca, Sr, Ba can be 0.30% by wt. up to 50% atomic.

The substitution element(s) and/or interstitial element(s) are preferably present in the alloy to provide the alloy with a tensile strength which is at least 20% greater than that of the pure base element (by pure it is meant that the base element is at least 99.999% pure). Preferably, the tensile strength of the alloy is at least 50% greater than that of the pure base element. The tensile strength can be 100% greater and as much as five or ten times that of the pure metal, or more, particularly when combined with one or more of the strengthening methods discussed elsewhere.

Precipitation-hardened alloys contain small (often nanometer-sized, e.g. 0.1-50 nm) and finely dispersed precipitates in the alloy lattice. Precipitates with a crystal structure similar to that of the matrix can cause significant elastic distortion in the matrix lattice surrounding each precipitate particle. The consequence is increased friction against dislocation glide, and as a consequence the yield strength is increased.

Metallic glass alloys can be formed by rapid cooling of certain alloy compositions. The homogenous composition of the melt is frozen-in. Because of the glassy structure, there are no crystallographic slip planes and no dislocations with defined Burgers vectors. High yield strength and little ductility result. Young's modulus is usually smaller than that of a crystalline alloy. However, the structural isotropy results in an isotropic Young's modulus.

Further discussion on metallic glass alloys is to be found in L. A. Davis, in Rapidly Quenched Metals, N. J. Grant and B. C. Giessen (editors), MIT Press (1976); J. C. M. Li, in Frontiers in *Materials Science—Distinguished Lectures*, L. E. Murr and C. Stein (editors), Marcel Dekker (1976) 527; and F. Szuecs, C. P. Kim, and W. L. Johnson, Mechanical properties of Zr56.2Ti13.8Nb5.0Cu6.9Ni5.6Be12.5 ductile phase reinforced bulk metallic glass composite, Acta Materialia, Vol.49 (2001) 1507-1513.

TABLE 1

Examples of Substitutional Alloy Elements and their Effects

| Substitutional alloy elements | $T_m$ °C. | $T_b$ °C. | Average Young's modulus GPa | Comments |
|---|---|---|---|---|
| Cr | 1860 | 2680 | 279 | Continuous range of solid solubility in beta-Ti, low solubility (0.5 atom %) in alpha Ti. Ti—Cr alloys are age-hardenable through formation of fine coherent precipitates (omega phase) |
| Mo | 2615 | 4610 | 325 | Continuous range of solid solubility in beta Ti, low solubility (0.4 atom %) in alpha Ti. Alpha-Ti—Mo alloys are age-hardenable through formation of fine coherent precipitates (omega phase) |

TABLE 1-continued

Examples of Substitutional Alloy Elements and their Effects

| Substitutional alloy elements | $T_m$ °C. | $T_b$ °C. | Average Young's modulus GPa | Comments |
|---|---|---|---|---|
| W | 3420 | 5555 | 411 | Similar to Ti—Mo alloys |
| Mn | 1244 | 2060 | 191 | Up to 30 atom % solubility in beta-Ti, 0.4 atom % in alpha-Ti. Ti—Mn alloys are age-hardenable. |
| Re | 3180 | 5690 | 466 | Up to 50 atom % solubility in beta-Ti, 0.03 atom % in alpha-Ti. Ti-rich alloys (up to about 10 at. % Re) are age-hardenable. |
| Ir | 2446 | 4390 | 528 | Up to 15 atom % solubility in beta-Ti, and about 1 atom % in alpha-Ti. Ti-rich Ti—Ir alloys are are age-hardenable through the formation of $Ti_3Ir$ precipitates. |

Strengthening Methods

There are several methods for improving strength of the substrate alloy or pure metal, which can be used individually or in combination. First, metallurgical methods may be used to make the substrate alloy/metal stronger. Suitable methods include solid-solution-strengthening, precipitation-strengthening, phase-transformation-hardening, strain-hardening, texture-hardening, strengthening by grain size refinement, and combinations thereof.

Strain Hardening

Strain hardening derives from buildup of dislocation density $\rho(\perp)$ in a metal with plastic strain. Typical dislocation densities (measured as dislocation line length per unit volume) range from $10^6$ cm/cm$^3$ in well annealed or recrystallized metal or alloy specimens to $10^{12}$ cm/cm$^3$ in cold-worked (plastically strained) specimens. At low dislocation density an individual dislocation often has a long mean free path over which it can slip at a low shear stress; then the yield strength of the material is low. At high dislocation density the dislocation lines tend to be tangled and form intersections, and as a consequence dislocations have a short mean free path or are locked in-place. The result is high yield strength. A typical relation between the increase in yield strength, $\Delta\sigma$, and dislocation density is:

$$\Delta\sigma = A\, G\, b\, (\rho)^{1/2} \quad \text{(Eqn. 8)}$$

where A is a proportionality constant, G is shear modulus, b is the length of the Burgers vector, and $\rho$ is the dislocation density of a given material.

Further discussion of strain hardening is to be found in J. G. Sevillano, P. Van Houtte and E. Arnoudt. *Large Strain Work-Hardening and Textures*, Progress in Materials Science, Vol. 25 (1981) pp 69-412; T. H. Courtney, *Mechanical Behavior of Materials*, McGraw-Hill (2000) Chapter 5 'Work Hardening', pp.179-181; and H. Wiedersich, J. Metals, Vol.16 (1964) 425.

The following references discuss alloy hardening to increase yield strength: R. L. Fleischer, 'Solid Solution Hardening' in The Strengthening of Metals, D. M. Peckner, editor, Reinhold Publ. Co., NY (1964) 93; A. Kelly, *Strong Solids*, Clarendon Press, Oxford (1966); A. Kelly and R. B. Nicholson (editors), *Strengthening Methods in Crystals*, Amsterdam Elsevier (1971); E. W. Collings, *The Physical Metallurgy of Titanium Alloys*, Am. Society for Metals (1984) pp. 130.-147; E. Fromm and G. Hoerz, "Hydrogen, Nitrogen, Oxygen and Carbon in Metals" in International Metals Reviews (1980) 269-311; Z. Liu and G. Welsch, "Effects of Oxygen and Heat Treatment on the Mechanical Properties of Alpha and Beta Titanium Alloys", Metall. Trans. A, Vol. 19A (1988) 527-542.

Other references on hardening include E. W. Collings, *The Physical Metallurgy of Titanium Alloys*, Am. Society for Metals (1984) pp. 115-130; J. L. Murray, The Cr—Ti System, in Phase Diagrams of Binary Titanium Alloys, (J. L. Murray editor) ASM (1987); E. W. Collings, *The Physical Metallurgy of Titanium Alloys*, Am. Society for Metals (1984) pp. 130-135; E. W. Collings, in *Titanium Alloys* (H. Boyer, E. W. Collings, G. Welsch, editors) ASM Materials properties handbook (1994) pp. 57 ff.

Strengthening By Small Grain Size

Grain refinement to smaller and smaller grain size (smallest≈10 nm) or to fibers with small width increases the tensile yield strength according to Hall-Petch mechanism:

$$\sigma_y = \sigma_o + K\, d^{-1/2} \quad \text{(Eqn. 9)}$$

where $\sigma_y$ is the yield strength of the polycrystalline metal, $\sigma_o$ is a reference yield strength of the metal having very large grains or being a single crystal, K is a material-characteristic constant, and d is the grain size. The exponent n is approximately 0.5 for many metals, but may deviate from 0.5. The table below shows values of the Hall-Petch relationship for a few metals.

| Material | $\sigma_o$ [MPa] | K [MN/m$^{3/2}$] |
|---|---|---|
| Al | 16 | 0.07 |
| Al-3.5% Mg | 49 | 0.26 |
| Be | 22 | 0.41 |
| Ti | 78 | 0.40 |
| Zr | 29 | 0.25 |
| Nb | 69 | 0.04 |
| Ta | 186 | 0.64 |

The Hall-Petch mechanism is especially effective in combination with strain-hardening. Examples are cold drawn wires with fine-fibrous, interlocked fiber-grain structure and with a high dislocation density. In such tensile yield strengths as high as 6 GPa have been achieved.

Further discussion of hardening by grain refinement is to be found in E. O. Hall, Proc. Royal Society (London) Vol. B64 (1951 474); N. J. Petch, J. Irons and Steel Institute, Vol. 174 (1953) 25; R. W. Armstrong, O. Codd, R. M. Douthwaite and N. J. Petch, "The Plastic Deformation of Polycrstalline Aggregates," Phil. Mag., Vol. 7 (1962) 45-58; and R. W. Armstrong, Advances on Materials Research, Vol. 5 (1971) 101.

Strengthening by Phase Transformation—Martensite

Martensites can be obtained after quenching rapidly through a phase transformation and undercooling the metastable undercooled phase until a new metastable martensite phase forms by diffusionless transformation. Strength is derived from lattice distortion which some martensites have, namely the martensites of Fe—C alloys. Titanium and zirconium can also be quenched to form martensites. They are not always hard but sometimes they are soft. However with a low-temperature aging treatment (e.g., around 300° C. for a Ti-6Al-4V alloy) a soft martensite can be further transform into a hard precipitation-strengthened microstructure.

Martensite trengthening methods are described in further detail in J. W. Christian, "The Strength of Martensite" A. Kelly and R. B. Nicholson (editors), *Strengthening Methods in Crystals*, Amsterdam Elsevier (1971) and in Z. Liu and G. Welsch, "Effects of Oxygen and Heat Treatment on the Mechanical Properties of Alpha and Beta Titanium Alloys", Metall. Trans. A, Vol. 19A (1988) 527-542.

Table 2 lists exemplary valve metals and alloying elements that can increase the tensile yield strength of valve metal alloys and other suitable anode elements. Table 3 lists oxides suitable for forming a dielectric film, the metals from which they are made, and certain properties thereof. Table 4 lists mixed oxides for dielectric films, constituent metals from which they can be made, and certain properties. It will be noted that high dielectric constant values can be obtained using mixed oxides of group IIA, IVA, IVB, and VB elements, and also in oxide mixtures of group IA and group VB elements.

TABLE 3

Exemplary oxide dielectrics and metals from which the respective oxides can be made

| Oxide | Dielectric constant | H kJ/mol $O_2$ | $T_m$ ° C. | $T_b$ ° C. | Element | $T_m$ ° C. | $T_b$ ° C. |
|---|---|---|---|---|---|---|---|
| BeO | 7.35 | −1219 | 2507 | | Be | 1287 | 2471 |
| MgO | 9.65 | −1203 | 2826 | 3600 | Mg | 650 | 1090 |
| CaO | 11.8 | −1270 | 2927 | | Ca | 842 | 1484 |
| SrO | 13.3 | −1181 | 2665 | | Sr | 770 | 1375 |
| BaO | 34 | −1107 | 2013 | | Ba | 727 | 1897 |
| $La_2O_3$ | | −1196 | 2305 | 4200 | La | 920 | 3455 |
| $Ce_2O_3$ | 7 | −1197 | 2400 | | Ce | 799 | 3424 |
| $TiO_2$ | 170 | −912 | 1843 | | Ti | 1668 | 3287 |
| $ZrO_2$ | 12.5 | −1079 | 2710 | | Zr | 1855 | 4409 |
| $HfO_2$ | | −1144 | 2774 | | Hf | 2233 | 4603 |
| $Ta_2O_5$ | 27 | −837 | 1785 | | Ta | 3017 | 5458 |
| $Nb_2O_5$ | | −760 | 1512 | | Nb | 2477 | 4744 |
| $Al_3O_2$ | 7 | −1117 | 2054 | | Al | 660 | 2519 |
| $Ga_2O_3$ | | −726 | 1725 | | Ga | 30 | 2204 |
| $In_2O_3$ | | −617 | 2000 | | In | 157 | 2072 |
| $SiO_2$ | 4.4 | −858 | 1713 | 2950 | Si | 1414 | 3265 |
| $GeO_2$ | 7.44 | −580 | 1115 | | Ge | 938 | 2833 |
| $SnO_2$ | | −582 | 1127 | | Sn | 232 | 2602 |
| PbO | 25.9 | −218 | 888 | | Pb | 327 | 1749 |

H is enthalpy of oxide formation.
$T_m$ and $T_b$ are the melting and boiling temperatures of oxides and of the corresponding metals, respectively.

TABLE 2

Properties of valve metals and elements that form oxide dielectrics and alloying elements that can increase the tensile yield strength

| Base Element | $T_m$ ° C. | $T_b$ ° C. | Young's Modulus at 20° C. GPa | Suitable Alloy Elements to Increase Yield Strength |
|---|---|---|---|---|
| Be | 1289 | | 318 | B, C, N, O, Mg, Ca, Sr, Ba, Y, lanthanide elements, Ti, Zr, Hf, V, Ta, Cr, Mo, W, Re, Al, Si, Ge, Sn, Ga, In, Nb |
| Ti | 1668 | 3287 | 120 | B, C, N, O, Be, Mg, Ca, Sr, Ba, Y, lanthanide elements, Zr, Hf, V, Nb, Ta, Cr, Mo, W, Re, Al, Si, Ge, Sn, Ga, In, Pb |
| Zr | 1855 | 4409 | 98 | B, C, N, O, Be, Mg, Ca, Sr, Ba, Y, lanthanide elements, Ti, Hf, V, Nb, Ta, Cr, Mo, W, Re, Al, Si, Ge, Sn, Ga, In, Pb |
| Hf | 2233 | 4603 | 141 | B, C, N, O, Be, Mg, Ca, Sr, Ba, Y, lanthanide elements, Ti, Zr, V, Nb, Ta, Cr, Mo, W, Re, Al, Si, Ge, Sn, Ga, In, Pb |
| V | 1902 | 3410 | 128 | B, C, N, O, Be, Mg, Ca, Sr, Ba, Y, lanthanide elements, Ti, Zr, Hf, Ta, Cr, Mo, W, Re, Al, Si, Ge, Sn, Ga, In |
| Ta | 3017 | 5458 | 186 | B, C, N, O, Be, Mg, Ca, Sr, Ba, Y, lanthanide elements, Ti, Zr, Hf, V, Nb, Cr, Mo, W, Mn, Tc, Re, Al, Si, Ge, Sn, Ga, In |
| Nb | 2477 | 4744 | 105 | B, C, N, O, Be, Mg, Ca, Sr, Ba, Y, lanthanide elements, Ti, Zr, Hf, V, Ta, Cr, Mo, W, Re, Al, Si, Ge, Sn, Ga, In |
| Al | 660 | 2519 | 70.6 | B, C, N, O, Be, Mg, Ca, Sr, Ba, Y, lanthanide elements, Ti, Zr, Hf, V, Ta, Cr, Mo, W, Re, Si, Ge, Sn, Ga, In |
| Si | 1414 | 3265 | 113 | B, C, N, O, Be, Ca, Sr, Ba, Y, lanthanide elements, Ti, Zr, Hf, V, Ta, Cr, Mo, W, Re, Al, Ge, Sn, Ga, In |
| Ge | 938 | 2833 | 79.9 | B, C, N, O, Be, Ca, Sr, Ba, Y, lanthanide elements, Ti, Zr, Hf, V, Ta, Cr, Mo, W, Re, Al, Si, Sn, Ga, In |

TABLE 4

Examples of mixed oxides with high dielectric constant values
and of metals from which the oxide mixtures can be made

| Compound | Dielectric constant | Elements | Melting Temperatures ° C. | Boiling Temperatures ° C. |
|---|---|---|---|---|
| $Ta_2O_5 + TiO_2$ | 25 to 100 | Ta, Ti | 3017, 1668 | 5458, 3207 |
| $Ta_2O_5 + TiO_2 +$ BaO | 25 to 1000 | Ta, Ti, Ba | 3017, 1668, 727 | 5458, 3207, 1897 |
| $BaTiO_3$ | 3600 | Ba, Ti | 727, 1668 | 1897, 3207 |
| $KSr_2Nb_5O_{15}$ | 1200 | K, Sr, Nb | 63, 770, 477 | 779, 1375, 4744 |
| $K(Ta, Nb)O_3$ | 34000 | K, Ta, Nb | 69, 3017, 2477 | 779, 5458, 4744 |
| $Pb_3MgNb_2O_9$ | 10000 | Pb, Mg, Nb | 327, 650, 2477 | 1749, 1090, 4744 |

The oxide matrix is to provide high dielectric strength and low leakage current, so it enables operation at a voltage from 2 to 1000 Volts. Group IIA elements (Be, Mg, Ca, Sr, Ba) and/or group IVA elements (Pb, Sn, Ge, Si, C) can be added to the substrate alloy. These yield, upon anodizing, a high-dielectric-constant oxide component in the dielectric film, for example $BaTiO_3$ or $Pb(ZrTi)O_3$. It is beneficial to add elements to the substrate alloy that favor the formation of glassy or amorphous oxide during anodization and inhibit the formation of crystalline oxide.

The above metal alloy combinations in the form of a solid solution, or finely dispersed phase mixture, and/or as a metallic glass, can provide an alloy with a high tensile strength. The strength is advantageous in supporting compressive growth stress in the dielectric layer. Non-metallic or semi-metallic elements, such as B, C, N, O, Ge, Si, when alloyed to the valve metal also increase strength by raising the friction stress against dislocation glide in such alloy. When the alloy element(s) causes locally increased bond strength in the alloy it will also increase the elastic stiffness. Another example is alloying a valve metal, such as titanium, with one or more elements that have high melting point and high Young's modulus, e.g., Mo, W, Re, to increase the Young's modulus and tensile yield strength.

Making the substrate alloy mechanically strong enables it to support a high compressive plane-stress in an adherent dielectric film. A strong substrate can support the stress with a high dielectric to metal volume ratio, which is beneficial for maximizing the energy density of a capacitor.

Effect of Anode Shape

Certain simple geometrical shapes and uniform radius of curvature of the surface of a capacitor electrode enable a high dielectric/metal volume ratio, the dielectric being capable of sustaining a high electric field strength and forming a capacitor with high packaging efficiency and high energy density. The methods outlined are beneficial for capacitors operating at any voltage, and are particularly beneficial for capacitors operating at high voltage. Compressive stress will also enhance the performance of a dielectric in applications other than capacitor.

The geometrical shape of a capacitor anodes consisting of anode metal/alloy and an adherent dielectric film can also be selected to enable a high dielectric/metal volume ratio and a high volumetric packing density, to yield a high energy density capacitor.

Imposing and maintaining a compressive stress on a dielectric during its synthesis, fabrication into a capacitor, storage, and/or operation is beneficial for the dielectric's electric field strength and for its electrical resistivity.

Figure 2:
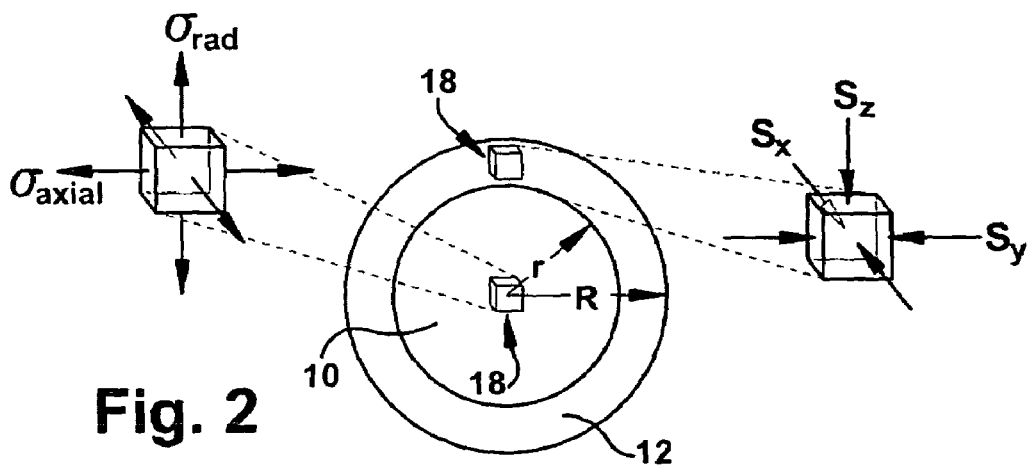
FIG. 2 shows a first capacitor anode geometry (sphere) and stresses in the metal substrate and in the oxide dielectric surface film.
Figure 3:
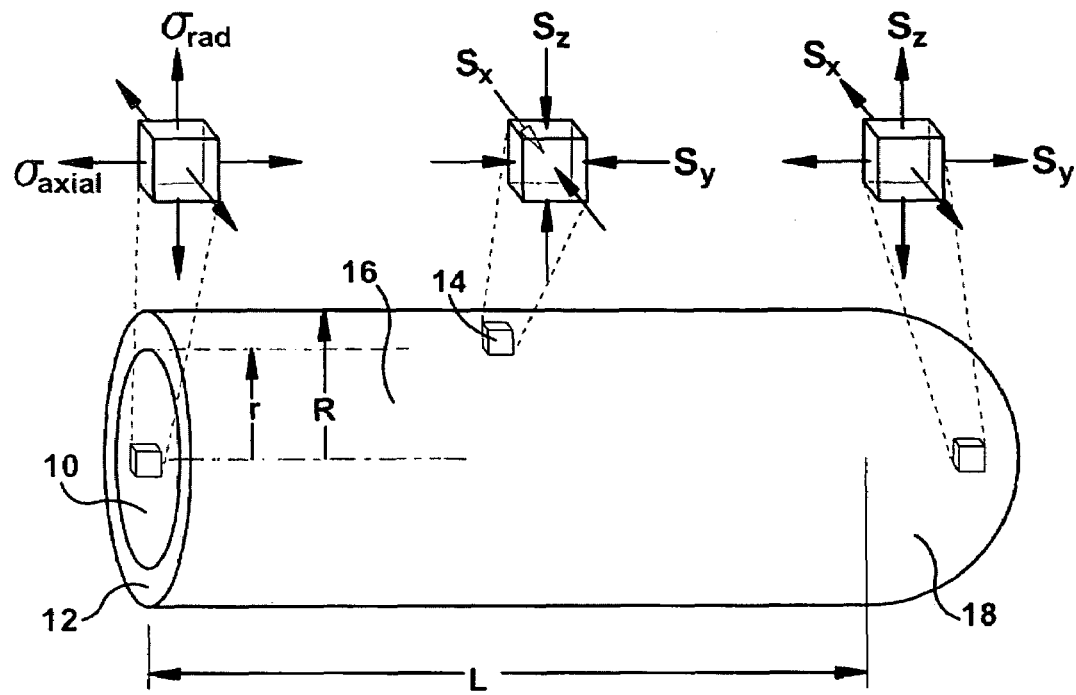
FIG. 3 shows a second capacitor anode geometry -(cylinder) and stresses in the metal substrate and in the oxide dielectric surface film.
Figure 4:
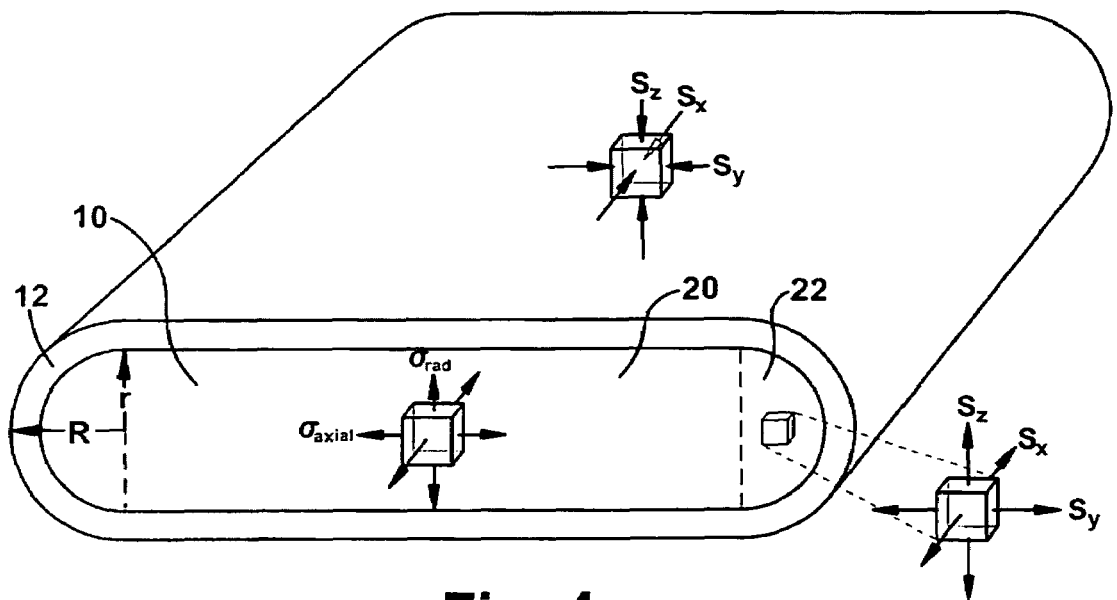
FIG. 4 shows a third capacitor anode geometry (plate) and stresses in the metal substrate and in the oxide dielectric surface film.

While FIG. 1 illustrates a capacitor comprising a single layer of dielectric bonded to one surface of a substrate, other capacitor anode geometries, such as sphere, cylinder, and plate, are also contemplated. FIGS. 2-4 show the stresses in the metal substrate and in (oxide) dielectric surface films for such geometries. The sphere of FIG. 2 comprises a spherical substrate 10 of radius r and a concentric layer of dielectric 12 having an outer radius R and thus a thickness (R−r). The cylinder of FIG. 3 has a central portion 16 comprising a cylindrical substrate of radius r and a dielectric of outer radius R, plus a hemispherical end portion 18 at the end(s) of its y (axial) axis. The plate of FIG. 4 has a planar central portion 20 comprising a rectangular substrate of a thickness r in the z direction, although round or other shapes of substrate are also contemplated. On upper and lower sides, the central portion is bonded to a dielectric 12 of thickness (R−r). The plate also has a semicircular curved end portion(s) 22 at its periphery. Similar end portions (not shown) may be provided at ends of its x axis. For a given oxide stress and anode cross section distance 2r, the largest tensile stresses in the metal substrate 10 are in the sphere and hemisphere portions and in the longitudinal directions x of cylinder and plate anodes. The metal anodes can be designed so that the largest tensile stress can be safely borne by the metal substrate without fracture, yielding, or creep-deformation.

The growth stress of an isotropic oxide film of uniform thickness is biaxial compression and is denoted by $S_x$ or $S_y$, which are stresses in the x-y plane of the film. The normal stress is denoted with $S_z$. In a discharged film $S_z$ is zero. When the film is electrically charged, the attraction force between the positive and negative charges on either side of the film generate a compressive normal stress, and $S_z$ is greater than zero. The growth stress in the oxide film can be as high as the oxide's flow stress or fracture stress, whichever is smaller. For the growth of a uniform oxide film, the flow stress is preferably smaller than the fracture stress. The stress magnitude is then determined by a yield criterion, e.g., according to Tresca or Von Mises. The Tresca criterion is the simplest, and is shown in Eqn. 10. It states that yielding begins when the difference between the largest and the smallest principal stresses reaches the value of the oxide's flow stress, $Y_{oxide}$. During growth of the dielectric 12, the insertion of new molecules into existing oxide film causes compressive stress to build up in the film plane until the stress reaches a magnitude at with yielding occurs. This will then determine the stress magnitude in the oxide.

$$\text{Tresca Yield Criterion } S_{largest} - S_{smallest} = Y_{oxide} \quad \text{(Eqn. 10)}$$

Stress values can be assessed as shown below.

I. Stresses in the Oxide Film

A. Oxide Film at Zero Voltage $$\text{Film normal: } S_z = 0 \quad \text{(Eqn. 11)}$$

$$\text{Film plane: } S_x = S_y < 0, \quad \text{(Eqn. 12)}$$

The in-plane compressive stress can be as high as the oxide's yield stress, i.e., $|S_x|$ can be as high as $Y_{oxide}$.

B. Oxide Film with Applied Voltage $$\text{Film normal: } S_z < 0 \quad \text{(Eqn. 13)}$$

The magnitude of the compressive stress is determined by electric field and charge density.

$$\text{Film plane: } S_x = S_y < 0 \quad \text{(Eqn. 14)}$$

Because of the compression in the z-direction, the in-plane compressive stress can exceed the oxide's flow stress, i.e., $|S_x|$ and $|S_y|$ can be as high as $Y_{oxide}+|S_z|$ II. Tensile Stresses in the Metal Substrate
A. Sphere-Shaped Anode $$\sigma = -S(R^2-r^2)/r^2 \quad \text{(Eqn. 15)}$$

It is a hydrostatic tensile stress
B. Cylinder
(i) Cylindrical Part of Anode $$\text{Axial stress: } \sigma_{axial} = -S(R^2-r^2)/r^2 \quad \text{(Eqn. 16A)}$$

$$\text{Radial stress: } \sigma_{rad} = -S(R-r)/r \quad \text{(Eqn. 16B)}$$

(ii) Hemispherical End of Anode $$\text{Axial stress: } \sigma_{axial} = -S(R^2-r^2)/r^2 \quad \text{(Eqn. 17)}$$

$$\text{Radial stress } -S(R-r)/r < \sigma_{rad} < -S(R^2-r^2)/r^2 \quad \text{(Eqn. 18)}$$

C. Plate
(i) Flat Central Portion $$\text{Longitudinal stress } \sigma_{long} = -S(R-r)/r \quad \text{(Eqn. 19)}$$

$$\text{Stress in width direction } \sigma_{width} = -S(R-r)/r \quad \text{(Eqn. 20)}$$

(ii) Rounded Edges or Corners $$\text{Highest stress } \sigma = -S(R^2-r^2)/r^2 \quad \text{(Eqn. 21)}$$

Stress in the metal is highest in regions with convex surface curvature. For a given oxide film thickness (R−r) the anode tensile stress increases with decreasing radius of curvature, r. The tensile yield strength or creep-strength of the metal needs to be sufficiently high so that it can support even the highest encountered stress without plastic deformation.

Surface Area Per Volume of Anode
It is desirable for the anode to have a large surface area per unit volume, A/V. The ratio depends on the size and shape of the anode. For a sphere of radius r:

$$A_{sphere}/V_{sphere} = 3/r \quad \text{(Eqn. 22)}$$

For a cylinder of radius r and length $l >> r$ $$A_{cyl}/V_{cyl} \approx 2/r \quad \text{(Eqn. 23)}$$

The end of a cylinder behaves like a sphere.

For a flat plate of thickness 2r and length or diameter $d >> 2r$ $$A_{plate}/V_{plate} \approx 1/r \quad \text{(Eqn. 24)}$$

The edges of a plate behave like cylinders, and the corners behave like spheres.

Equations 22-24 are valid for a capacitor anode whose dielectric film is much thinner than the substrate. The highest area per volume ratio is obtained with a sphere, and the cylinder and flat plate geometries appear to be next best for achieving a high A/V ratio. However, when anodes with greater oxide/metal volume ratio are made, or when the film thickness becomes a significant fraction of the substrate thickness, the cylinder and flat plate geometries become more favorable for high A/V ratio.

Electrical Limitations of Energy Density by Radius of Curvature of a Capacitor Anode The anode metal can be shaped to a variety of geometries. Of interest are geometries that enable the maximum amount of dielectric film per volume of metal substrate. Basic geometries are sphere, cylinder and plate (FIGS. 2-3). The present discussion is on the energy density of a cylindrical capacitor anode consisting of metal substrate and oxide dielectric. If the cylinder has a metal radius r and an oxidized radius R, and the oxide has a dielectric strength $\xi$, then the maximum voltage that can be applied to the oxide is given by equation 25.

$$V = \xi r \ln(R/r) \quad \text{(Eqn. 25)}$$

For a cylinder of outer radius R, maximum voltage can be applied to the oxide when the metal radius r is related to the oxide radius R by Eqn. 26. The value of e is 2.7183.

$$R = e\, r \quad \text{(Eqn. 26)}$$

At the ratio of (R/r=e) the maximum voltage that can be applied to the oxide is given by the expression:

$$V = \xi R\, e^{-1} \quad \text{(Eqn. 27)}$$

Assuming a cylindrical shaped capacitor similar to that shown in FIG. 3, with a metal substrate radius r, length l, and a dielectric charge density q (Coulomb/surface area). The maximum charge Q that the capacitor can store is proportional to the metal/oxide interface area and is equal to:

$$Q = 2\pi r\, l\, q \quad \text{(Eqn. 28)}$$

The energy E of this capacitor is equal to:

$$E = \tfrac{1}{2} Q\, V = \pi q\, \xi r^2\, l\, \ln(R/r) \quad \text{(Eqn. 29)}$$

The energy density U is that of the capacitor electrode plus dielectric. It is given by the expression:

$$U = \frac{q \xi r^2 \ln(R/r)}{R^2} \quad \text{(Eqn. 30)}$$

To maximize the energy of a capacitor of outer radius R, the metal radius r should be equal to:

$$r = R\, e^{-1/2} \quad \text{(Eqn. 31)}$$

The maximum energy E is then:

$$E = \tfrac{1}{2} \pi q\, \xi R^2\, l\, e^{-1} \quad \text{(Eqn. 32)}$$

and the maximum energy density U is:

$$U = E/\text{Volume} = \tfrac{1}{2} q\, \xi\, e^{-1} \quad \text{(Eqn. 33)}$$

Effect of Metal Tensile Yield Strength on Energy Density of a Cylindrical Anode

In one embodiment, the ratio of outer oxide radius R to metal radius r is chosen to maximize the energy density of the capacitor electrode, namely:

$$R/r = e^{1/2} \quad \text{(Eqn. 34)}$$

The ratio of oxide cross section to metal cross section will then be (e−1) to 1. The role of the tensile yield strength of the anode is to support a certain compressive stress in the dielectric. If a certain compressive stress S is to be maintained in the oxide, force balance requires the tensile yield strength of the metal to be at least (e−1) times the compressive stress of the oxide. A lower strength metal would require a smaller ratio of R/r, and the capacitor would have a less than maximum energy density. If the oxide requires a compressive stress S, and the metal has a yield strength $Y_m$, then the maximum ratio of oxide cross sectional area $A_O$ to metal cross sectional area $A_M$ is defined by the force balance, equation 35.

$$A_O S = A_m Y_m \quad \text{(Eqn. 35)}$$

The relation between R and r is $$R = r\, (A_O/A_M + 1)^{1/2} = r\, (Y_m/S + 1)^{1/2} \quad \text{(Eqn. 36)}$$

For values of $Y_m/S$ up to $(e-1)$, the maximum energy density of the capacitor with an oxide stress S is $$U = \frac{1/2 q \xi \ln(Y_m/S + 1)}{Y_m/S + 1} \quad \text{(Eqn. 37)}$$

This expression is valid from $0 \leqq Y_m/S \leqq e-1$

For $(Y_m/S) \geqq (e-1)$, the energy density is $$U = \frac{1/2 q \xi}{e}$$

whereas in the low metal yield strength regime it is $$Lim\ Y_m/S \to 0,\ U = \frac{1}{2} q \xi (Y_m/S) \quad \text{(Eqn. 38)}$$

According to this equation the energy density of the capacitor increases as the ratio $Y_m/S$ increases. This means, it is advantageous for the metal substrate to have a high tensile yield strength.

The following examples are intended to demonstrate the effects of anode geometries and capacitor materials and are not intended to limit the scope of the invention.

EXAMPLES

Example 1

High purity as-cast tantalum rod is used for a capacitor anode. Tantalum oxide has good dielectric properties under high compressive stress. The tensile yield strength Y of pure tantalum metal is relatively low. It can be about 200 MPa. The compressive yield strength of the $Ta_2O_5$ dielectric S can be about 2 GPa. Other property values are as follows:

| | |
|---|---|
| Dielectric strength | $\xi$ = 700 V/μm |
| Charge density | q = 0.12 Coulomb/m² |
| Yield strength of tantalum | Y = 200 MPa |
| Compressive stress in dielectric | S = 2 GPa |

In one embodiment, a cylindrical wire anodized to 100 Volt would have a diameter of 6.29 micrometers (2R). The ratio of R/r is determined using Eqn. 16A (substituting the Y value of 200 MPa for $\sigma_{axial}$). The energy density of the capacitor anode is then determined using Eqn. 30.

$U = ln(1.1) \times 42\ [J/cm^3]/1.1 = 3.6\ J/cm^3$

This value is relatively low compared to what would be achievable if tantalum had a higher tensile yield strength, such as can be achieved by the alloying and strengthening methods discussed above. If its yield strength Y were greater than $(e-1)S$, the energy density of such capacitor anode would be more than 4 times that a capacitor made from low tensile strength (200 MPa) tantalum, namely:

$U = e^{-1} 42\ J/cm^3 = 15.4\ J/cm^3$

Example 2

Assume the oxide dielectric has no compressive stress. Then a low tensile strength anode metal will suffice and will allow the capacitor to have a high ratio of oxide volume to metal volume. The maximum energy density is:

$U = \frac{1}{2} q\ \xi e^{-1}$

However, the charge density q and the dielectric strength $\xi$ of a non-compression-stressed oxide are 100 times lower than in oxide with compressive stress, so the property data are:

| | |
|---|---|
| Useable dielectric strength | $\xi$ = 7 V/μm |
| Charge density | q = 0.0012 Coulomb/m² |

In one embodiment, a wire anodized to 100 Volt would have a diameter of 94.2 micrometers.

In this example the energy density $U = 1.54 \times 10^{-3}\ J/cm^3$ is less than 1/1000th the energy density of the low yield strength tantalum capacitor.

Example 3

The property data are the same as in example 1, except the tensile yield strength of tantalum is increased to 500 MPa, either by adding strengthening elements to tantalum, such as nitrogen or carbon, or by strain-hardening. The energy density is:

$U = 42\ [J/cm^3]ln(1.25)/1.25 = 7.4\ J/cm^3$

This energy density is more than twice that of the low tensile strength tantalum anode but less than half of what is achievable with ultra high tensile strength tantalum.

Example 4

The property data are the same as in example 1, except the tensile yield strength of tantalum is increased to 1 GPa, so that: Y=S/2

In one embodiment, a wire anodized to 100 Volt would have a diameter of 1.73 micrometers. The energy density of the capacitor anode (tantalum plus oxide film) is:

$U = 42\ [J/cm^3]ln(1.5)/1.5 = 11.5\ J/cm^3$

Example 5

The property data are-the same as in example 1, except the tensile yield strength of tantalum metal electrode is increased to 2 GPa. At this yield strength: Y=S In one embodiment, a wire anodized to 100 Volt would have a diameter of 1.166 micrometers.

The energy density of the capacitor anode (tantalum plus oxide film) is now:

$U = 42\ [J/cm^3]ln(2)/2 = 14.5\ J/cm^3$

Cold-working during drawing of tantalum wire hardens the alloy, and at the same time the grains are shaped into long and narrow ribbons. As a consequence, the tensile yield strength is increased, by as much as 4 GPa. The tensile strength of such wire is many times greater than that of sintered pure tantalum. The tensile strength can be also increased with alloy or dopant elements, such as nitrogen or carbon, which are non-detrimental to the electrical properties of the oxide dielectric grown on the alloy surface. Besides strengthening the anode metal, certain alloy and dopant elements can also increase the charge density of the oxide film grown on the alloy. Such elements are Ti, Zr, Hf, Nb, Pb, earth alkali elements, and rare earth elements (lanthanides). Increased charge density of the oxide and increased tensile strength of the metal substrate can lead to a large increase in energy density.

Example 6

Assume property values of:

| Dielectric strength | $\xi = 700$ V/μm |
| Charge density | $q = 1$ Coulomb/m$^2$ |
| Metal yield strength | $Y = S$ |
| Compressive stress in dielectric | $S$ |

In one embodiment, a wire anodized to 100 Volt would have a diameter of 1.166 micrometers.

The energy density for this example is quite large, $U=350$ $[J/cm^3]\ln(2)/2=121$ $J/cm^3$ Example 7

Assume property values (e.g., for a Ca-doped $TiO_2$) of:

| Dielectric strength | $\xi = 700$ V/μm |
| Charge density | $q = 6$ Coulomb/m$^2$ |
| Metal yield strength | $Y = S$ |
| Compressive stress in dielectric | $S$ |

In one embodiment, a wire anodized to 100 Volt would have a diameter of 1.166 micrometers.

Here, the energy density of this capacitor is very large.

$U=2100$ $[J/cm^3]\ln(2)/2=728$ $J/cm^3$

This value is over 200 times the energy density of the low tensile strength tantalum capacitor in example 1.

Formation of Rigid and Strong Metal Substrate for Capacitor Anode

A strong anode metal substrate is desirable to enable the support compressive stress in the dielectric film of a capacitor. It is desired to provide this support with the least amount of elastic or plastic distortion. Therefore, a metal substrate with high elastic stiffness or high Young' modulus and high tensile yield strength is desired. The stiffness and strength properties are preferably isotropic.

Methods for achieving high elastic stiffness include:
a) Adding alloy elements to a valve metal to impart strong bonding between the atoms of the alloy. For example, adding tantalum or tungsten to titanium forms Ti—Ta or Ti—W alloy with increased Young's modulus. Likewise, the addition of oxygen to titanium to form a solid solution alloy increases the Young's modulus of the alloy over that of pure titanium. For example, oxygen increases the Young's modulus of titanium or a Ti-alloy by 10 to 14 GPa per weight percent oxygen added. Y. T. Lee and G. Welsch, Mat. Sci. & Engr., Vol. A128 (1990) pp.77-89; N. Hsu and H. Conrad, *Scripta Metall.*, vol. 5, pp. 905-908 (1971). Another example is the addition of carbon or nitrogen to form a solid solution with tantalum. Young's modulus of such alloy is increased over that of pure tantalum.
b) If a crystallographic texture is formed, such as the [110] texture of fiber grains in drawn tantalum wire, the Young's modulus of the [110] orientation is imparted.

Methods for achieving high tensile yield strength include:
a) Add alloy elements to a valve metal to impart strong bonding between the atoms of the alloy and to impart obstacles against dislocation glide. For example, adding alloy elements, listed in Table 1, to a valve metal increases the frictional stress for dislocations and thereby increases the yield strength. The addition of interstitial alloy elements is particularly effective for increasing the yield strength with relatively small concentrations. For example, the addition of nitrogen to tantalum or titanium to form a solid solution alloy greatly increases the yield strength.
b) An alloy element may be dissolved at elevated temperature in a concentration that exceeds the solubility at room temperature. By quenching from elevated temperature a supersaturated solid solution may be frozen-in for increased strengthening effect.
c) The strengthening effect of an alloy element can be enhanced by an "aging heat treatment" to allow limited diffusion to permit the formation of small clusters of solute atoms or the formation of small precipitates. When clusters are formed at a dislocation core, the dislocation may be rendered immobile, hence yield or creep strength is increased. When solute atoms clusters result in fine precipitates, from 0.5 to 100 nm in size, these can distort the lattice of the alloy and form dislocation obstacles by themselves and result in especially high yield strength increase.
d) When the grain size in the metal/alloy is refined to a small size, e.g. by thermal and mechanical processing, a significant strength increase can be achieved because the grain boundaries are obstacles against dislocation glide and limit the length of a dislocation's glide path. In the metallurgical art this is referred to as "Hall-Petch strengthening." Further details of this are provided in R. W. Armstrong, Advances in Materials Research, vol. 5, p. 101 (R. F. Bunshah Editor, Wiley-Interscience (1971)).
e) Likewise, when a fiber texture is formed, e.g., during wire drawing, a significant strength increase can be achieved from refining the fiber width. The fiber boundaries serve as obstacles against dislocation glide. Fiber widths as small as 10 nm can be achieved by wire drawing and can result in a high tensile strength. This method applies to any crystalline metal or alloy. Fore example, a yield strength as high as 6 GPa can be achieved in drawn tantalum or tantalum alloy.
f) When the substrate metal has non-isotropic yield and fracture strength properties, e.g., a high yield strength in the longitudinal direction of a wire and a low yield- or fracture strength in the transverse direction, it may be of advantage to design the anode in a way that minimizes stress in the weak direction of the metal, e.g., one can exclude the wire end from forming an anode in order to avoid a high transverse tensile stress that could potentially cause fracture between the fibers at the wire end.
g) A very high yield strength can be achieved in an alloy when the grain size is made so small that it approaches an amorphous structure or the structure of a metallic glass.

Methods for achieving increased isotropy of stiffness and strength include:
a) The addition of alloy elements that stabilize a phase with high symmetry can be beneficial. For example, adding tantalum or tungsten to titanium to form a Ti—Ta or Ti—W alloy increases the volume fraction of body-centered-cubic (beta) phase relative to the hexagonal (alpha) phase of pure titanium and can result in a greater degree of elastic isotropy.
c) Making the grains small and with random crystal orientation improves the degree of isotropy.
d) Forming an alloy with an amorphous structure or as a metallic glass increases the isotropy of strength properties.

Importance of Uniformity of Anode Cross-section

An anode wire that is optimized for energy density preferably has a uniform cross section, at least over the majority of its length. Its radius of curvature of the surface r is preferably above a certain minimum value. Ideally, r should have the largest possible value allowed by the chosen anode geometry, that is, for a cylindrical rod anode the value of r is about half the diameter of the rod. Any localized decrease in rod diameter or radius of curvature could cause a local breakdown of the dielectric. A localized increase in diameter is generally not critical, but it would lower the energy density. Any surface bumps with low radius of curvature will concentrate the electric field in the oxide and cause potential breakdown. To avoid electrical breakdown, capacitors made with a non-uniform metal cross section are preferably operated at a reduced or de-rated voltage. However, de-rating reduces the energy density. Drawn round wire has advantages over a spongy anode structure because wire can be fabricated with a uniform radius of curvature throughout its length and with a smooth, polished, surface. Polishing the surface can be done mechanically, chemically, or electrochemically to remove any bumps, crevices, or grooves that have a small radius of curvature.

For a capacitor with a rod-shaped anode 10 spaced from a cathode, in the form of an outer tube by a dielectric 12, the voltage applied between the inner rod 10 and the outer tube has an electric field strength E at any point in the dielectric 12 which is inversely proportional to the distance of the point from the center of the anode rod 10. If the anode is spherical rather than cylindrical, it will be appreciated that the electric field strength E at any point in the dielectric 12 is inversely proportional to the square of the distance of the point from the center of the anode rod 10. This is also approximately the case for the hemispherical rounded end of an anode wire.

Wire anodes of uniform diameter can be efficiently packed in bundles of parallel wires. This enables very high energy- and power densities of the total package. It should be noted that the electric field of the dielectric film is much higher at corners and edges than at other regions. Optionally, the radius of curvature of the wire ends may be increased for reduced stress and for reduced field concentration-see FIG. 5. Alternatively or additionally the wire ends can be coated with an insulating material 50, such as Teflon, to avoid high stress or high electric field concentration. See FIG. 6.

Figure 7:
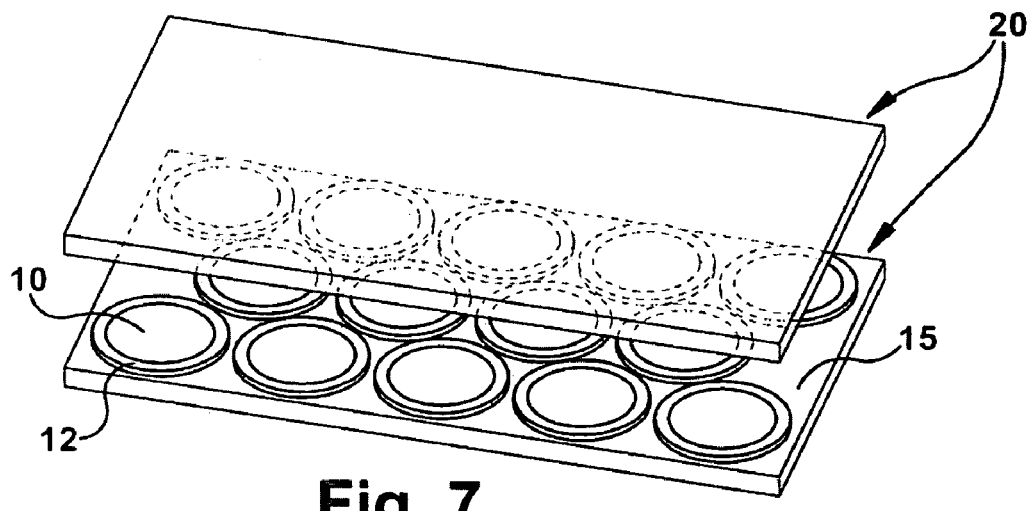
FIG. 7 is a perspective view of a capacitor formed from cathode plates and wire anodes similar to those of FIG. 5 or 6.

FIGS. 7-22 show other embodiments of anodes and capacitors, where similar elements are accorded the same numerals. FIG. 7 shows a capacitor comprising a cathode of high surface area wire anodes similar to those of FIG. 3 are packed between plates of a cathode 2, each wire being surrounded by a dielectric layer. An electrolyte 15 is infiltrated between the anode wires and the cathode sheets.

Figure 8A:
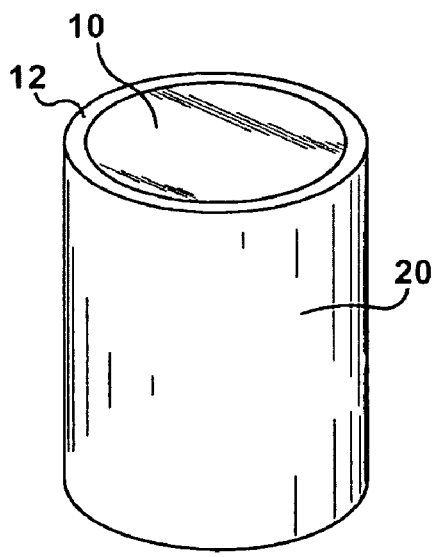
FIGS. 8a and 8b are perspective views of two alternative capacitor geometries.
Figure 8B:
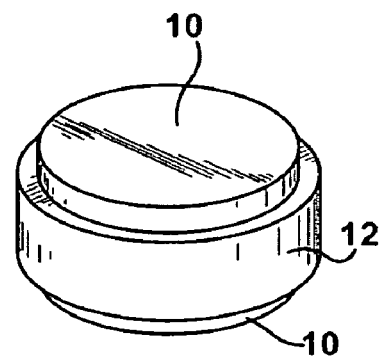

FIG. 8 shows two embodiments of a capacitor in which the electrodes have edges but no corners.

Figure 9A:
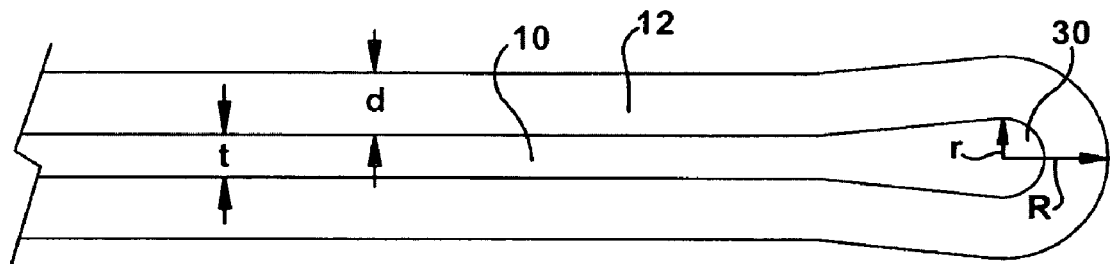
FIG. 9A is a cross sectional view of a capacitor anode with a plate shaped mid portion and an enlarged width end portion.

FIG. 9A is another way of reducing electric field concentration at the end of an anode by forming the anode from a sheet and creating a rounded end 30 having an increased radius of curvature than that of the majority of the anode substrate 10. For an anode of substrate thickness t (away from the rounded end) and dielectric thickness d and dielectric stress S:

$$tY + 2dS = 0$$

$$t = \frac{-2dS}{Y}$$

Figure 9B:
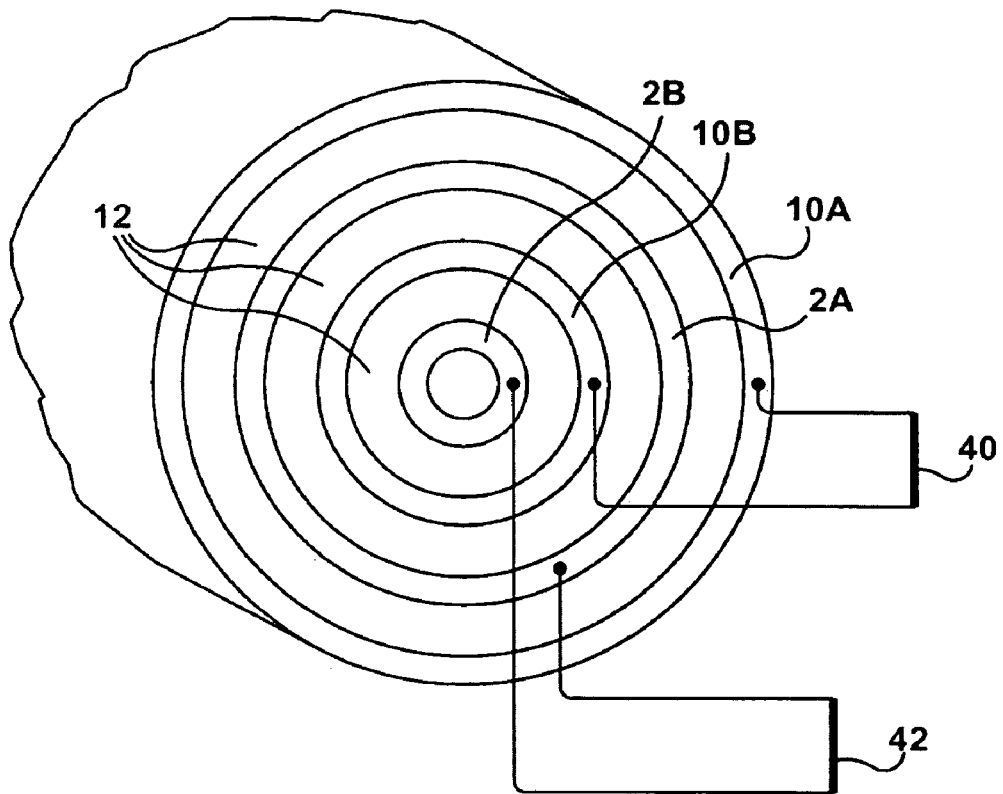
FIG. 9B is a perspective view showing tubular anodes and cathodes spaced by dielectric.

FIG. 9B is a cross section of a capacitor with a plurality of concentric cylinder electrodes each separated by a dielectric film 12 (and optionally by an electrolyte, not shown). The electrodes have edges but no corners. One set of electrodes 10A, 10B, etc. (e.g. anodes) are electrically connected at one end of the cylinder, the other set 2A, 2B of electrodes (e.g., cathodes), which alternate with the first set, are connected at the other end of the cylinder.

Figure 10:
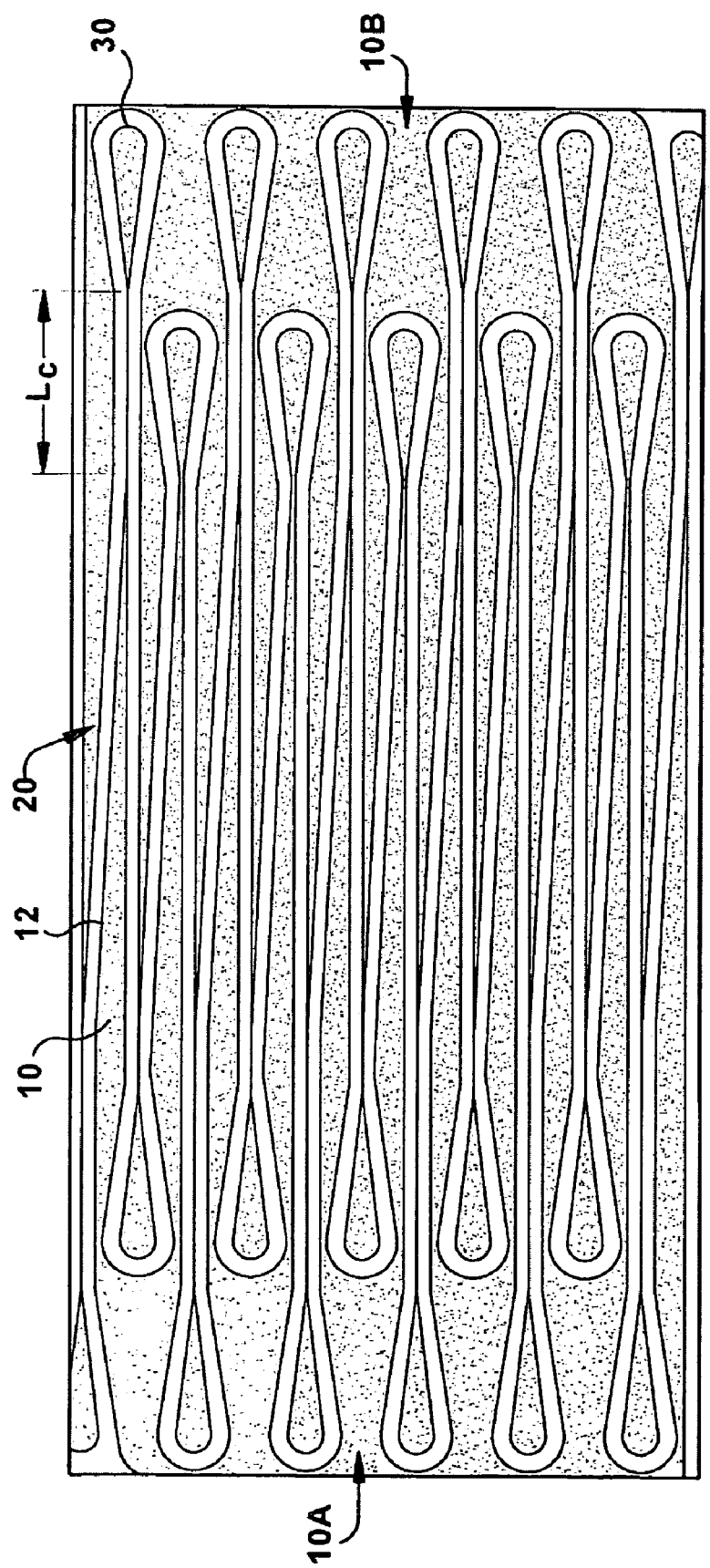
FIG. 10 shows interdigitated plate shaped anodes and cathodes with rounded ends, spaced by dielectric.

FIG. 10 sows plate shaped anodes and cathodes, similar to that shown in FIG. 9, which are interdigitated.

Figure 11:
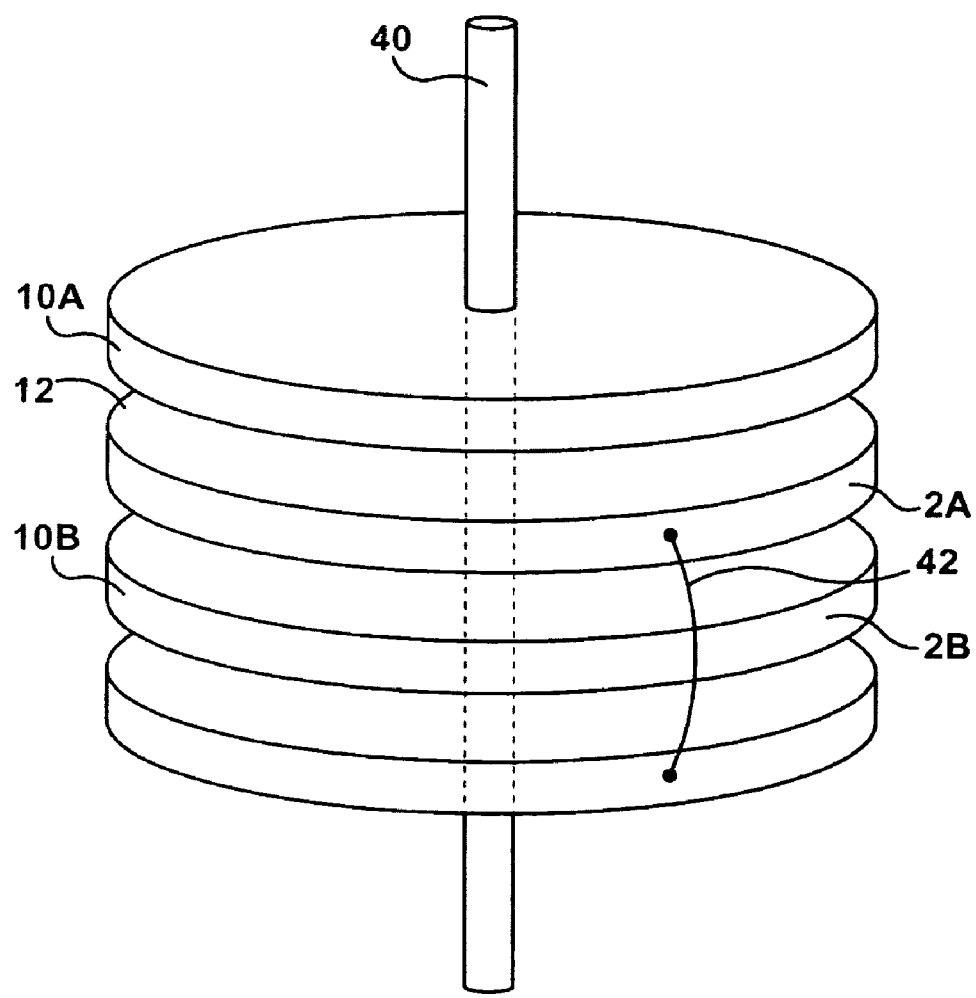
FIG. 11 is a perspective view of a capacitor comprising interdigitated plate shaped anodes and cathodes.

FIG. 11 shows a cross sectional view of a capacitor made of stacked disk electrodes 10A, 10B, etc. (e.g. anodes) and 2A, 2B (e.g., cathodes) separated by a dielectric film 12. Only four disks are illustrated, although it will be appreciated that there may be many more. One set of electrodes 10A, 10B, etc. is electrically connected on the center pin 40, the other set of electrodes 2A, 2B, etc. is electrically connected on the outside at 42.

Figure 5:
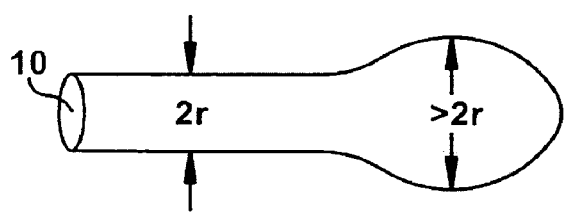
FIG. 5 is a perspective view of a rod-shaped anode showing how the radius of curvature of the wire ends may be increased for reduced stress and for reduced field concentration, e.g., by melting the end to form a ball.
Figure 6:
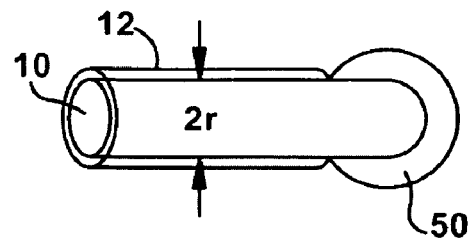
FIG. 6 is a perspective view of a rod-shaped anode fitted with a ball of insulating material, such as Teflon, which resists charging of the anode end.
Figure 12:
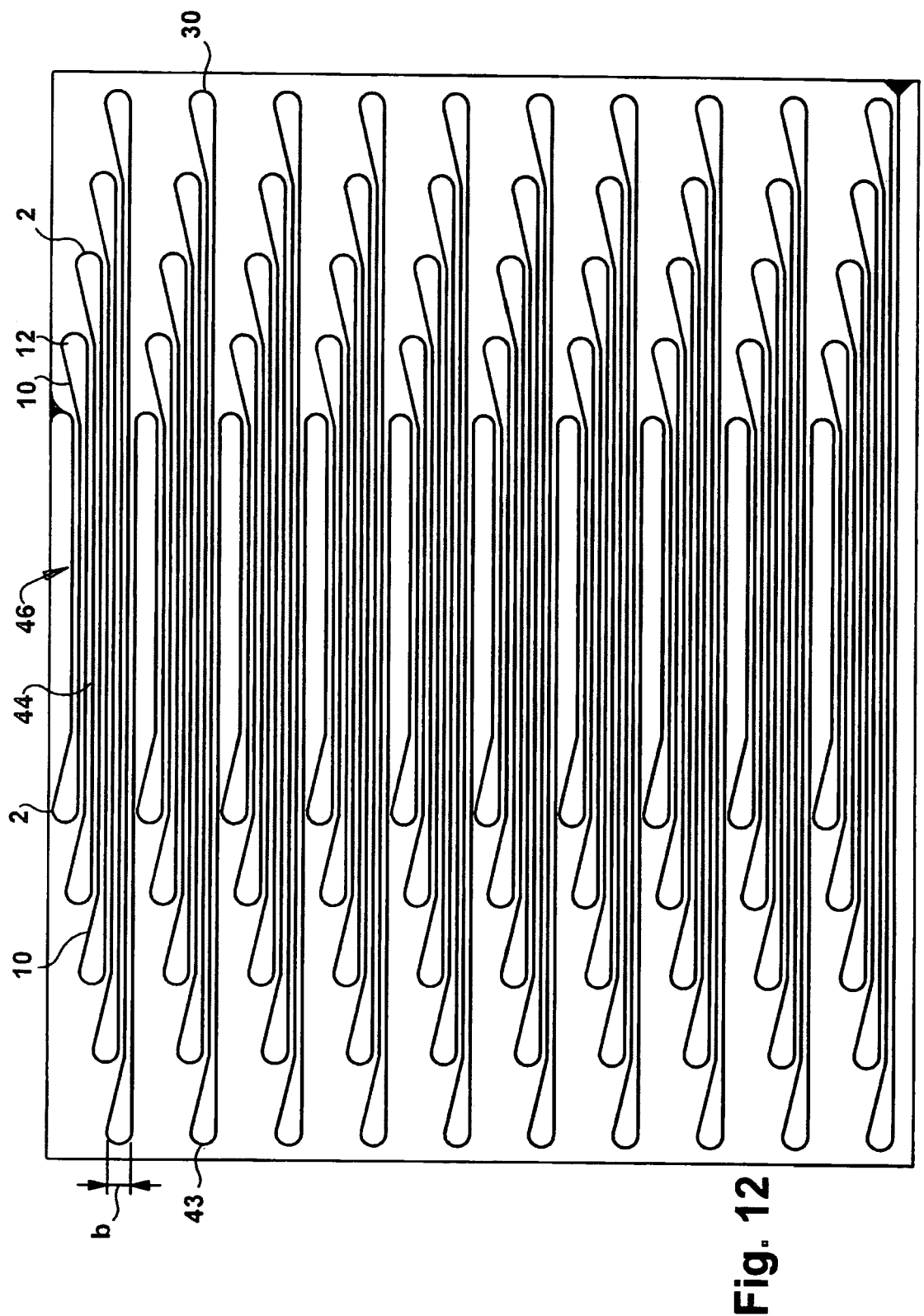
FIG. 12 is a cross sectional view of a capacitor with interdigitated generally plate shaped anode and cathode elements, each having rounded ends.

FIG. 12 shows a cross sectional view made up of a plurality of anode substrates 10 with rounded ends 30, which can be formed similar to those of FIGS. 5, 6, or 9. The anodes are interdigitated with cathodes 2, also with rounded ends 43. The length Lc of the central, consistent cross section region 44 of each anode can be relatively large, in comparison with the total length—e.g., 50% or more, preferably about 90% or more of the anode length, and can be up to about 99%, or more (the same applies to the consistent cross section region 46 of the cathode). The rounded ends 30, 43 of the anodes and cathodes are laterally spaced from one another to maximize packing. The rounded end may have a thickness b(2r), at its widest point, which is at least twice that of the thickness t of the electrode in the central region Lc. In the illustrated embodiment, b is at least 5 times the thickness (2r) of the electrode in the central region Lc. The desired thickness b is determined from equations (25) and (36), i.e., it depends on the minimum radius of curvature needed for the dielectric strength $\xi$, and maximum voltage to be applied.

Figure 13:
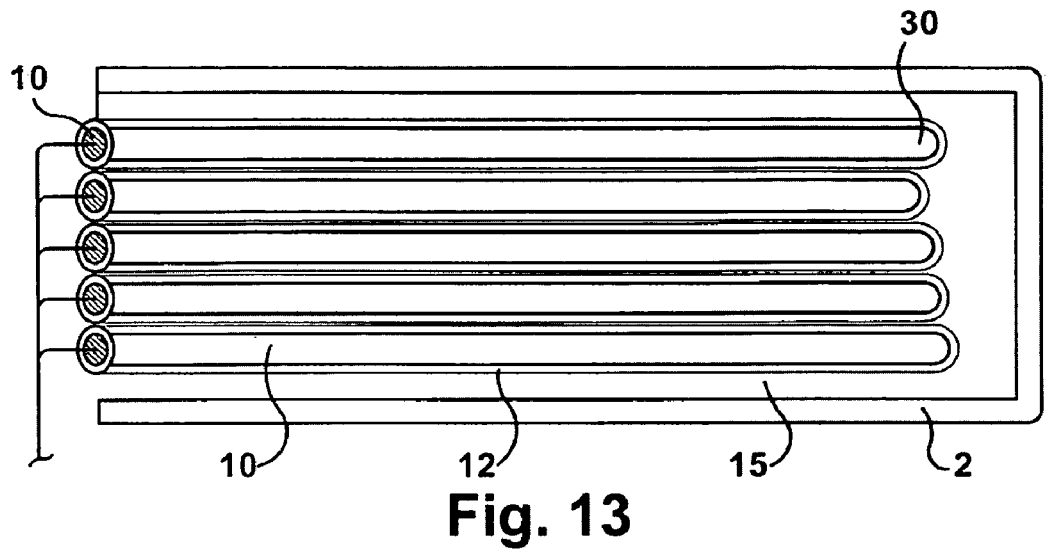
FIG. 13 is a perspective view of another embodiment of a capacitor comprising anodes having rounded ends and a cathode which surrounds the anodes.

FIG. 13 is a perspective view of another embodiment of a capacitor comprising cylindrical anode wires 10 having rounded ends 30. Each wire is coated with a dielectric 12. In this embodiment, the cross section of the anode wires is not enlarged at the ends 30. All of the anode wires are electrically connected to a common anode. A cathode 2 in the form of a housing surrounds a plurality of the anode wires. An electrolyte 15 surrounds the anode wires.

Figure 14:
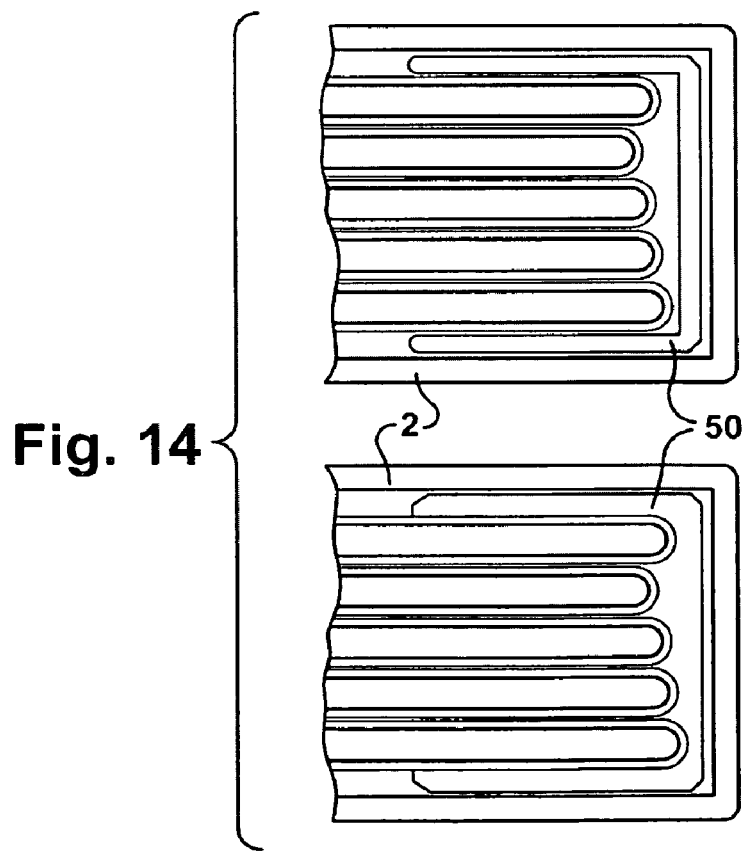
FIG. 14 is a cross sectional view of another embodiment of a capacitor comprising anodes having rounded ends and a cathode which surrounds the anodes and an insulator which surrounds ends of a plurality of the anodes to protect the ends against localized dielectric breakdown.

FIG. 14 is a cross sectional view of another embodiment of a capacitor similar to that of FIG. 13, but in this embodiment, an insulator or shield 50 formed from a material similar to that of FIG. 6, surrounds the rounded ends of a plurality of the anodes to protect the ends against localized dielectric breakdown.

Figure 15:
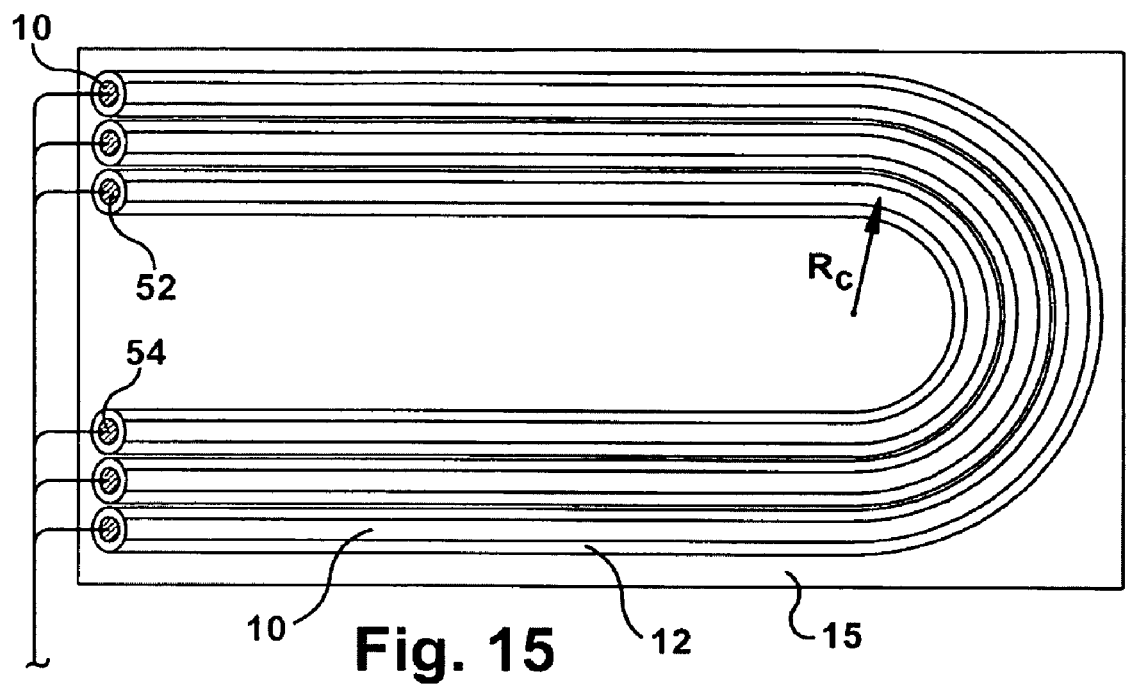
FIG. 15 is a cross sectional view of another embodiment of a capacitor comprising anodes bent into a U-shape.
Figure 16:
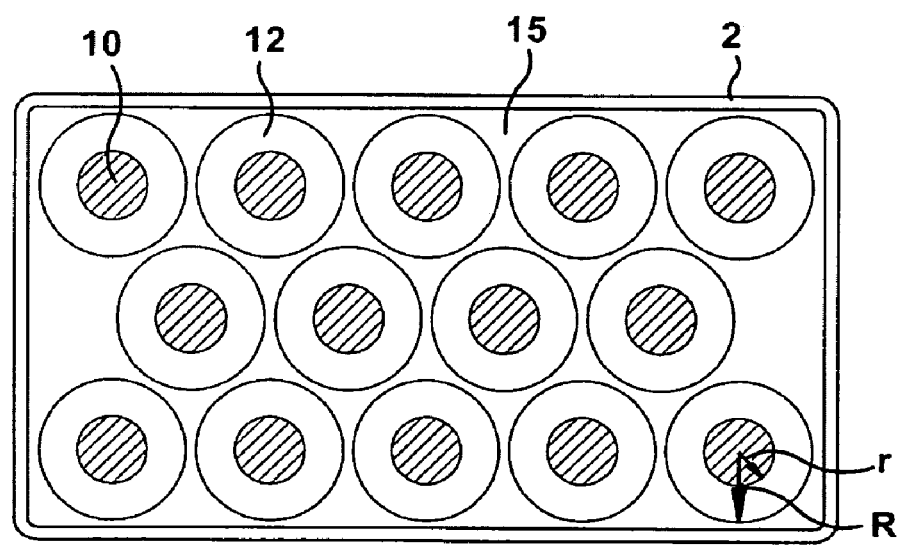
FIG. 16 is a cross sectional view of the capacitor of FIG. 15 showing closely packed anode wires.

FIG. 15 is a cross sectional view of another embodiment of a capacitor comprising anode wires 10 bent into a U-shape. The ends 52, 54 of each anode wire are connected to an insulated common anode. In the embodiment of FIG. 15, a set of three (or more) U-shaped anode wires are packed one inside of the other, with the innermost U-shaped wire having at least a minimum radius of curvature Rc around the bent portion. The wires may be arranged such that they lie in the same plane, or offset slightly, with alternating wires being positioned above or below the plane. As shown in FIG. 16, where only the ends of the wires are illustrated, it can be seen that a capacitor may be formed of a plurality of such sets showing closely packed anode wires. Each wire has a uniform radius of surface curvature r. Rc is preferably at least r. In the packed capacitor, the distance between the surface of the dielectric and the cathode 2 is preferably kept small to enable a low series resistance. Dense packing is desirable because it enables a high volume fraction of dielectric and a high energy density.

Figure 17:
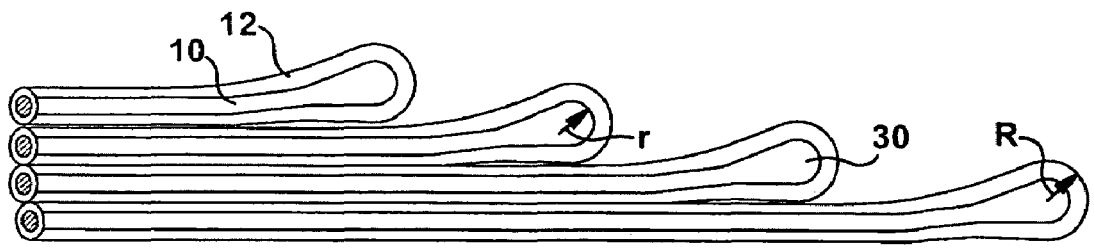
FIG. 17 illustrates overlapping of anode wires to achieve dense packing with the free ends spaced to allow for increased radius of curvature.
Figure 18:
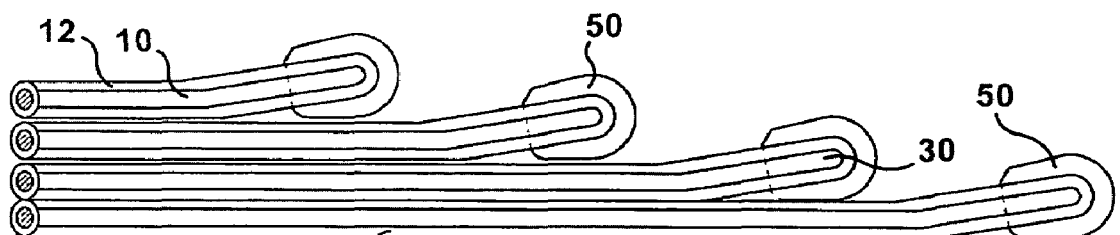
FIG. 18 illustrates overlapping of anode wires in which free ends and surrounding dielectric are coated with an insulator.

FIG. 17 illustrates overlapping of anode wires to achieve dense packing with the free ends spaced to allow for increased radius of curvature at the ends in a manner similar to that illustrated in FIG. 13. Alternatively, as shown in FIG. 18, the ends are coated with an insulator 50, similar to that of FIG. 6. In this embodiment, the wire ends 30 may have the same radius of curvature as the rest of the wire, or be enlarged, as for the ends of FIG. 17, or be of a reduced radius.

Figure 19:
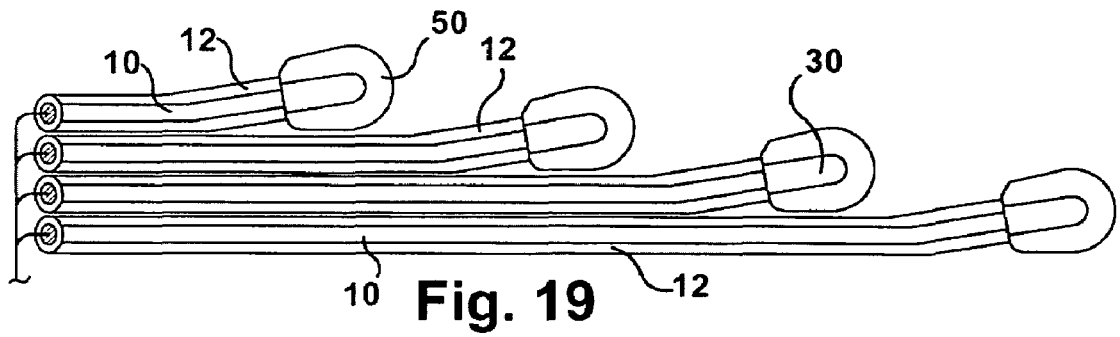
FIG. 19 illustrates overlapping of anode wires in which free ends are free of dielectric and are coated with an insulator.

FIG. 19 illustrates overlapping of anode wires similar to that of FIG. 18, but in which the free ends 30 are free of dielectric and are coated with an insulator 50.

Figure 20:
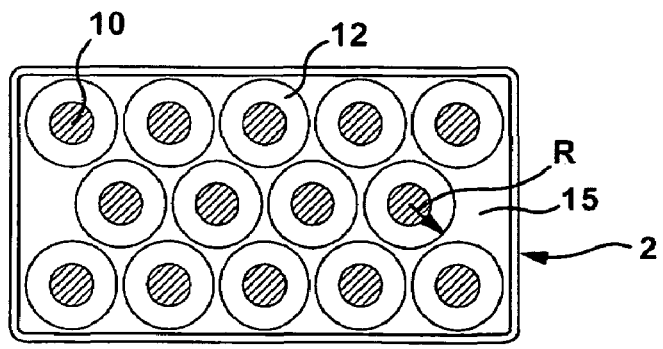
FIG. 20 illustrates how the anode wires of FIGS. 17-19 may be assembled in a capacitor.

FIG. 20 illustrates how the anode wires of FIGS. 17-19 may be assembled in a capacitor.

Figure 21:
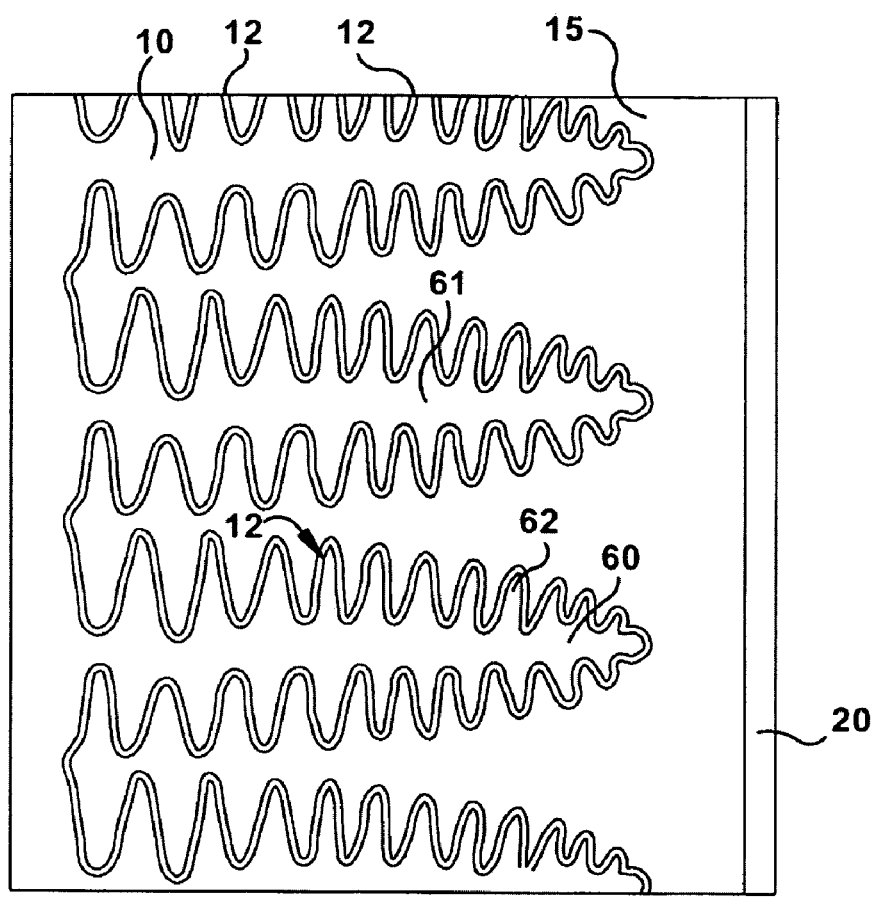
FIG. 21 is a cross sectional view of a capacitor according to another embodiment of the invention illustrating closely packed anode ends with a minimum radius of curvature in the form of dendrites of a sponge.
Figure 22:
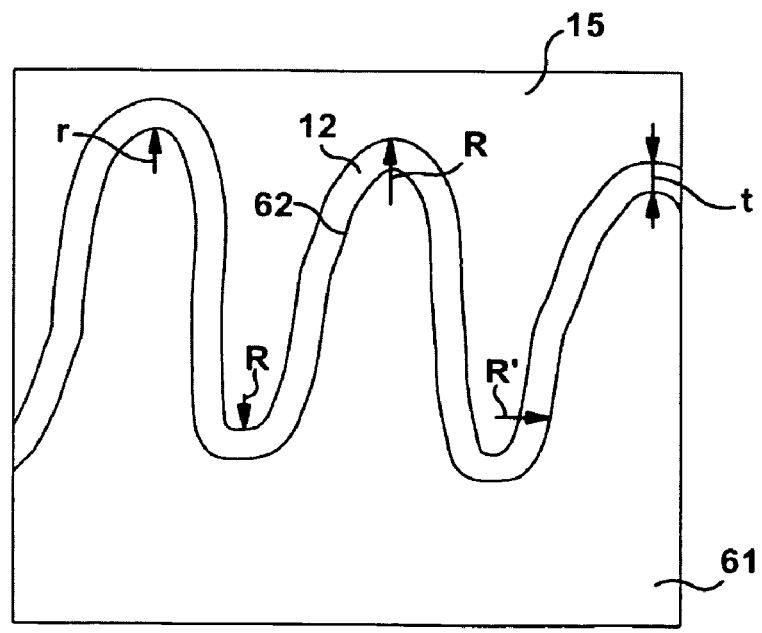
FIG. 22 is an enlarged cross sectional view of the capacitor of FIG. 21.
Figure 23:
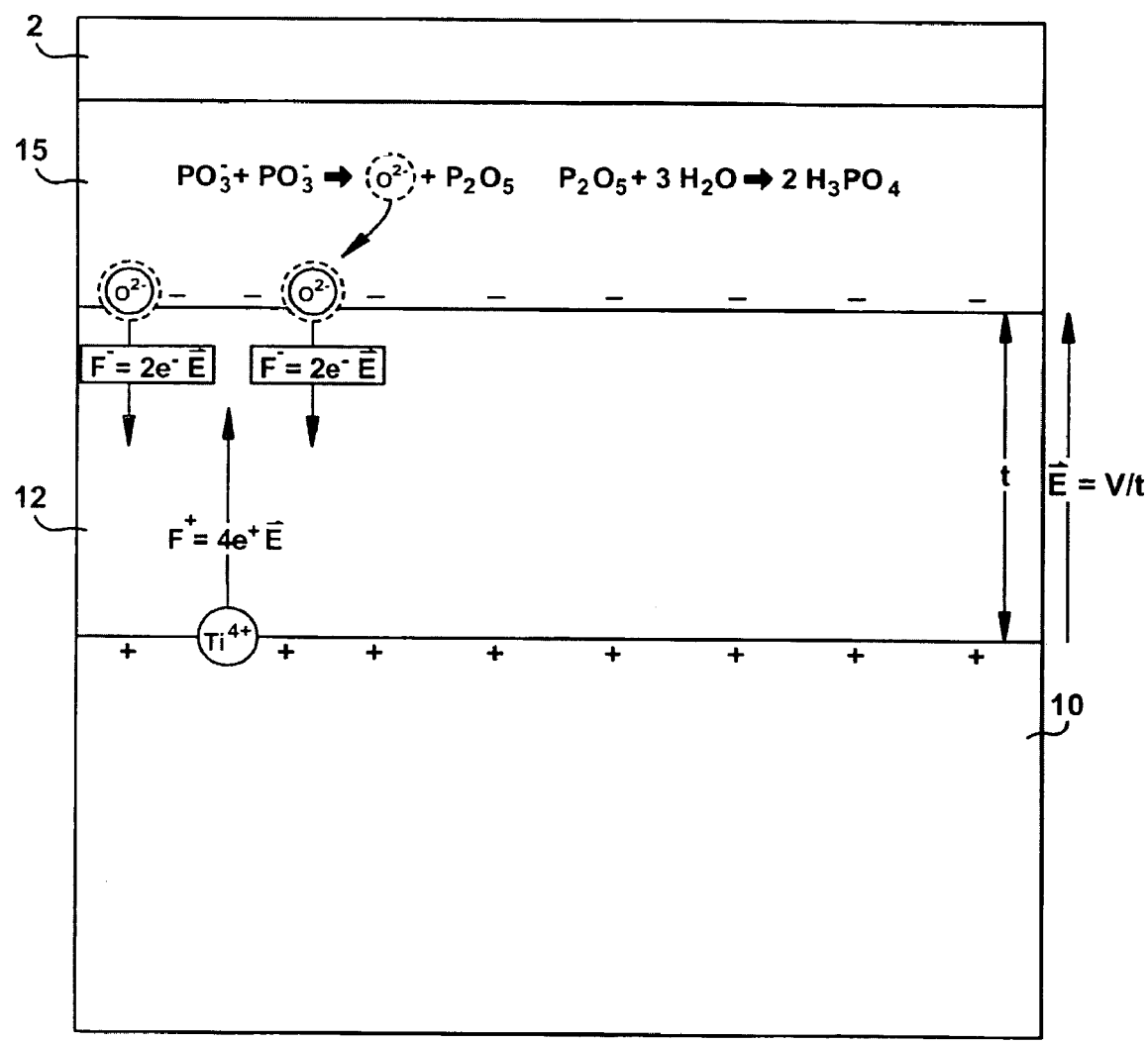
FIG. 23 schematically illustrates how compressive growth stresses are generated in an anodically grown oxide film and the corresponding tensile stress in the anode that balances the forces.

FIG. 21 is a cross sectional view of another embodiment of a capacitor. In this embodiment, the anode 10 is formed from a sponge material and comprises a plurality of dendrites 60. Each dendrite has a generally central spine 61 with side branches 62 extending therefrom. The dendrites are covered with a dielectric material 12 and surrounded by an electrolyte 15. In this embodiment, the cathode 2 is in the form of a flat plate, although other embodiments, such as a dendritic cathode, are also contemplated. Each side branch 62 preferably has a minimum radius of curvature r at its end (FIG. 22). It will be appreciated that, depending on the method of forming the sponge, there may be so me variation in the shape of the dendrites and side branches. In such instances, at least 80%, more preferably at least 90%, and most preferably, at least 95% of the side branches have the minimum radius r. Any concave portions of the substrate surface (e.g., indents) may have a radius of curvature R' which is greater than the dielectric film thickness t.

The dendrites can be formed by growing a metal or metal alloy sponge, for example, by depositing the dendrite material from a vapor containing a salt of the metal or alloy materials. Methods for forming dendritic sponges are described in U.S. application Ser. No. 09/914,517, filed on Apr. 29, 2002, and U.S. application Ser. No. 10/182,927, filed on Aug. 2, 2002, the disclosures of which are incorporated herein by reference in their entireties. By growing the dendrites under appropriate processing conditions, with consideration for time, temperature, and the like, the branches are readily formed without sharp corners and with the minimum radius of curvature. The minimum value of r (or R) can be determined, as before using equations 25 and 36.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A capacitor anode comprising:
an electrically conductive substrate;
a biaxially compressed dielectric film adhered to the substrate;
the dielectric having a tensile yield strength of at least $10^{-3}$ times the Young's modulus of the substrate.

2. The capacitor anode of claim 1, wherein the tensile yield strength is from about 10 MPa to about 6 GPa.

3. The capacitor anode of claim 1, wherein the Young's modulus is in the range of 10 to 600 GPa.

4. The capacitor anode of claim 1, wherein the Young's modulus is at least 50 GPa.

5. The capacitor anode of claim 1, wherein the biaxial compression is in a plane generally parallel with a surface of the substrate.

6. The capacitor anode of claim 1, wherein the tensile yield strength is at least $5\times10^{-3}$ times the Young's modulus of the substrate.

7. The capacitor anode of claim 1, wherein the biaxially compressed dielectric film is maintained under a biaxial compressive stress of at least 0.1 MPa.

8. The capacitor anode of claim 7, wherein the biaxially compressed dielectric film is maintained under a biaxial compressive stress of at least 1 MPa.

9. The capacitor anode of claim 1, wherein the biaxially compressed dielectric film has a dielectric strength of about 50 V/μm.

10. The capacitor anode of claim 1, wherein the biaxially compressed dielectric film has a dielectric constant of at least 20.

11. The capacitor anode of claim 10, wherein the dielectric constant of the biaxially compressed dielectric film is at least 1000.

12. The capacitor anode of claim 1, wherein the substrate comprises at least one of a strengthened metal, an alloy, and a compound of a metal.

13. The capacitor anode of claim 12, wherein the substrate comprises an alloy comprising a base element selected from elements Be, Ti, Zr, Hf, V, Ta, Nb, Al, Si, Ge.

14. The capacitor anode of claim 13, wherein the alloy comprises one or more alloying element selected from the group consisting of B, C, N, O, Be, Mg, Ca, Sr, Ba, Y, lanthanide elements, Ti, Zr, Hf, V, Nb, Ta, Cr, Mo, W, Mn, Re, Al, Si, Ge, Sn, Pb, and Ga in a sufficient amount to increase the tensile yield strength of the base element.

15. The capacitor anode of claim 13, wherein the alloy includes Ta at from about 10% to about 99% by weight of the ahoy, Ti at from about 90% to about 1%, oxygen at from about 100 ppm by weight to about 5% by weight, and optionally an earth alkali element at concentration of from about 100 ppm by weight to 5% by weight.

16. The capacitor anode of claim 1, wherein convex surfaces of the substrate have a minimum radius of curvature r defined by one or more of the expressions:

$$R=r(A_O/A_M+1)^{1/2}$$

$$R=r(Y_m/S+1)^{1/2}$$

Where r is the minimum substrate radius;
R is the radius of the biaxially compressed dielectric film;
$A_O$ is a cross sectional area of the biaxially compressed dielectric film in a plane perpendicular to a surface of the substrate;
$A_M$ is a cross sectional area of the substrate in a plane perpendicular to the surface of the substrate;
Y is the yield strength; and
S is the compressive stress in the biaxially compressed dielectric.

17. A capacitor comprising the capacitor anode of claim 1, further comprising a cathode spaced from the anode by the biaxially compressed dielectric film.

18. The capacitor of claim 17, further comprising an electrolyte intermediate the biaxially compressed dielectric film and the cathode.

19. The capacitor anode of claim 18, further comprising a voltage source which applies a maximum voltage V and wherein a minimum radius of curvature of the capacitor anode is related to the voltage by the expression:

$$V=\xi r\, ln(R/r)$$

where V is the applied voltage;
ξ is the electric field strength;
r is the substrate radius; and
R is the radius of the dielectric film.

20. A capacitor anode comprising:
an electrically conductive substrate;
a biaxially compressed dielectric film adhered to the substrate;
edges of the substrate having a minimum radius of curvature which is at least one fourth of a thickness of the adjacent biaxially compressed dielectric film.

21. The capacitor anode of claim 20, wherein the biaxially compressed dielectric film comprises at least 50% of a volume of the anode.

22. The capacitor anode of claim 20, wherein when the anode is subjected to an applied voltage, the electric field in the biaxially compressed dielectric film does not vary by more than a factor of two.

23. The capacitor anode of claim 20, wherein a volumetric energy density is at least one fourth of a maximum energy density of the biaxially compressed dielectric film where the maximum energy density U is given by the expression:

$$U = \tfrac{1}{2}\epsilon\epsilon_o\xi^2$$

where $\epsilon\epsilon_o$ is the absolute dielectric constant, and
ξ is the electric field strength.

24. The capacitor anode of claim 20, wherein the edges of the substrate have a radius of curvature when is at least one half of the thickness of the adjacent biaxially compressed dielectric film.

* * * * *

UNITED STATES PATENT AND TRADEMARK OFFICE
CERTIFICATE OF CORRECTION

PATENT NO. : 7,486,498 B2
APPLICATION NO. : 11/036507
DATED : February 3, 2009
INVENTOR(S) : Gerhard E. Welsch and Donald L. McGervey It is certified that error appears in the above-identified patent and that said Letters Patent is hereby corrected as shown below:

Column 32, Line 36 delete "ahoy" and insert --alloy--.

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,486,498 B2 | Page 1 of 1 |
| APPLICATION NO. | : 11/036507 | |
| DATED | : February 3, 2009 | |
| INVENTOR(S) | : Gerhard E. Welsch and Donald L. McGervey | |

It is certified that error appears in the above-identified patent and that said Letters Patent is hereby corrected as shown below:

Col. 1 line 11, insert --Government Funding—This invention was made with government support under Grant No. NRO000-00-C-0078 awarded by The National Reconnaissance Office. The United States government has certain rights to the invention.--

Signed and Sealed this
Sixth Day of March, 2012

David J. Kappos
*Director of the United States Patent and Trademark Office*